United States Patent [19]
Pinkston

[11] Patent Number: 5,409,345
[45] Date of Patent: Apr. 25, 1995

[54] HOIST ASSEMBLY

[76] Inventor: Donald L. Pinkston, 12295 Spruce La., Perry, Mich. 48872

[21] Appl. No.: 60,660

[22] Filed: May 13, 1993

[51] Int. Cl.$^6$ .............................................. B60P 3/12
[52] U.S. Cl. .................................... 414/563; 280/402
[58] Field of Search ................ 414/563, 546; 280/402, 280/491.2, 491.3; 212/180

[56] References Cited

U.S. PATENT DOCUMENTS

| | | |
|---|---|---|
| 2,436,485 | 2/1948 | Roxy . |
| 2,481,223 | 9/1949 | Johnson . |
| 2,515,833 | 7/1950 | Mueller . |
| 2,604,302 | 7/1952 | Francis . |
| 3,587,893 | 6/1971 | Laken ............................... 414/563 X |
| 3,715,042 | 2/1973 | Rellinger . |
| 4,047,733 | 9/1977 | Parkes . |
| 4,149,643 | 4/1979 | Skala et al. . |
| 4,152,006 | 5/1979 | Dunlap . |
| 4,316,617 | 2/1982 | Flaugh . |
| 4,543,030 | 9/1985 | Hawkins . |
| 4,544,175 | 10/1985 | Hubert . |
| 4,555,214 | 11/1985 | Morton . |
| 4,618,161 | 10/1986 | McNeill . |
| 4,708,358 | 11/1987 | Gehman et al. . |
| 4,710,090 | 12/1987 | DeLuca et al. .................. 414/546 X |
| 4,838,753 | 6/1989 | Gehman et al. . |
| 4,993,911 | 2/1991 | Grant . |
| 5,064,078 | 11/1991 | Van Staveren .................. 414/563 X |
| 5,281,078 | 1/1994 | Mills, Jr. ........................... 212/180 X |
| 5,326,216 | 7/1994 | Russ .................................. 280/402 X |

FOREIGN PATENT DOCUMENTS 2821436 11/1979 Germany .............................. 414/563

OTHER PUBLICATIONS

Publication No. 88469; Holmes International Inc.

Primary Examiner—Michael S. Huppert
Assistant Examiner—Stephen Gordon
Attorney, Agent, or Firm—Ian C. McLeod

[57] ABSTRACT

An improved hoist assembly 200 having a frame assembly 10 and a boom assembly 60 is described. The frame assembly is comprised of a box member 12 with channel member 12L having first and second holes 120 and 12P for mounting a first and second kingpin assembly 26 and 28. The second holes are spaced away from the first holes and allow for storage of the unused kingpin assembly. The box member has a lockable cover 12E which allows for storage of parts and other items directly within the hoist assembly. A boom 62 of the boom assembly is attached to the frame assembly and is protected on either side by cover plates 46 and 48. The boom is raised and lowered by a hydraulic pump assembly 74 electrically connected to an electrical system of a towing vehicle. A cross member support 66 supports a cross member 68 which is secured to an axle of a disabled vehicle by chains for towing the disabled vehicle. In an alternate embodiment, an underlift attachment 98 having an expandable cross member 112 with end bars 124 and 126, and legs 128 is positioned around the tires of the disabled vehicle to attach the disabled vehicle to the towing vehicle.

25 Claims, 16 Drawing Sheets

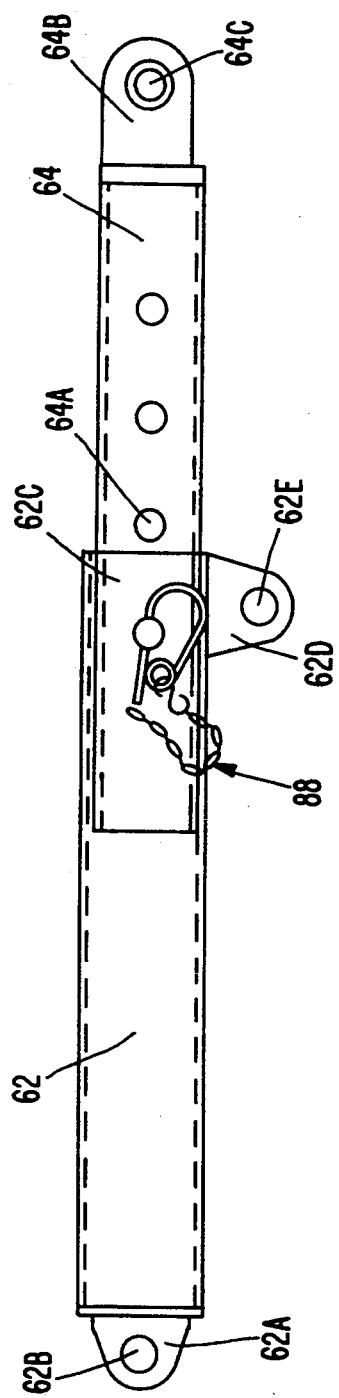
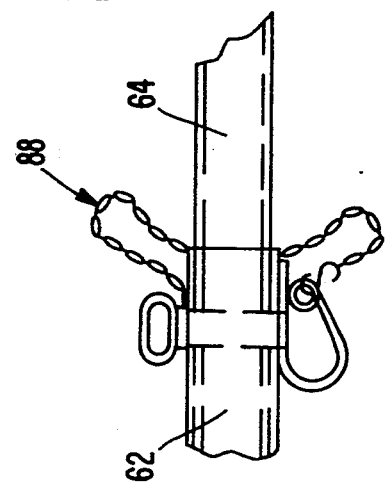

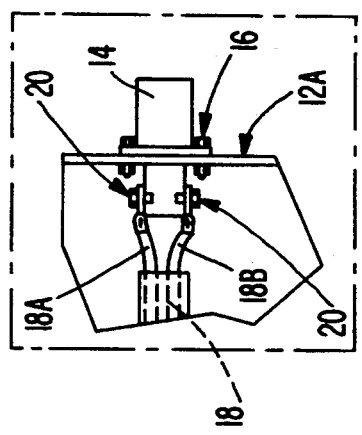
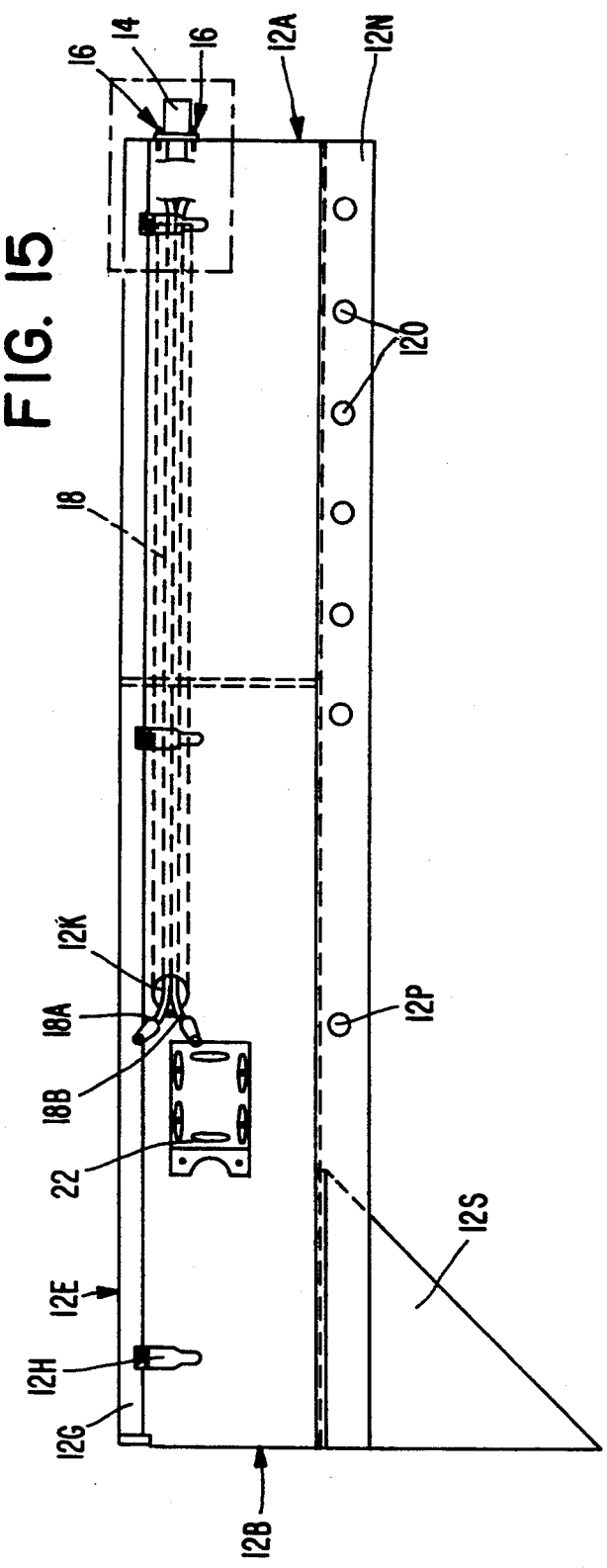

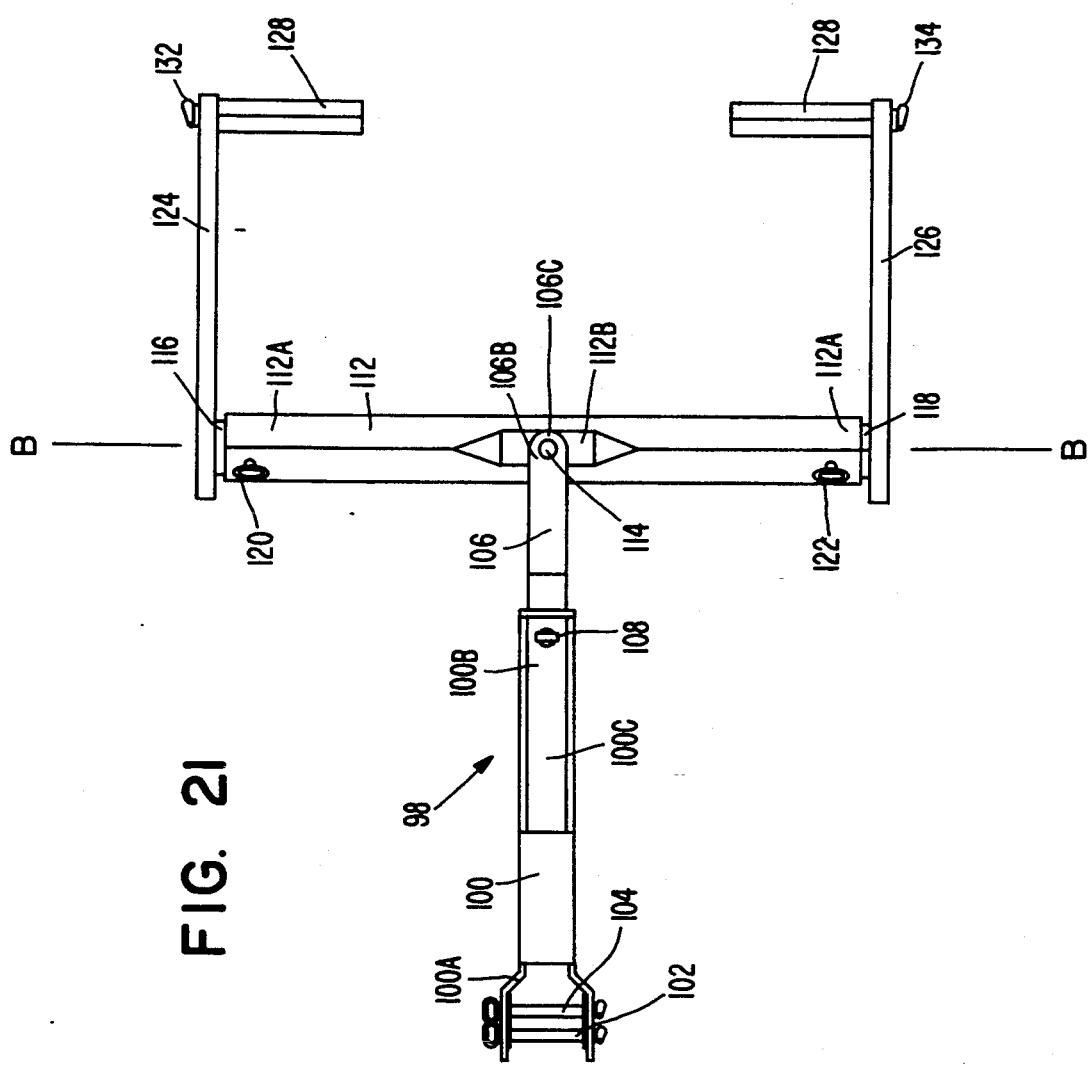

HOIST ASSEMBLY

BACKGROUND OF THE INVENTION (1) Field of the Invention

The present invention relates to an improved hoist assembly particularly for mounting on the fifth wheel of a vehicle for towing other vehicles. One method to mount the hoist assembly onto a vehicle is to mount a kingpin into the fifth wheel of the vehicle. In particular, the, present invention relates to a hoist assembly with a storage box along the frame of the assembly and a second alternate kingpin stored beneath the box.

(2) DESCRIPTION OF RELATED ART

The related patent art is set forth in U.S. Pat. Nos. 2,436,485 to Roxy; 2,481,223 to Johnson; 2,515,833 to Mueller; 2,604,302 to Francis; 3,715,042 to Rellinger; 4,047,733 to Parkes; 4,149,643 to Skala; 4,152,006 to Dunlap; 4,316,617 to Flaugh; 4,543,030 to Hawkins; 4,544,175 to Hubert; 4,555,214 to Morton; 4,618,161 to McNeill; 4,708,358 to Gehman; 4,838,753 to Gehman and 4,993,911 to Grant. These patents describe various fifth wheel mounted hoists and towing cranes. None of the apparatus described provide a frame including a box on the hoist for storage.

Publication No. 88469 shows a fifth wheel mounted hoist which utilizes an I beam construction for the frame. The I beam has openings for mounting pins which hold the kingpin assembly in position on the frame which produce weak points in the beam. The hoist does not provide for a storage box.

There is a need for hoists with an improved light-weight frame structure for supporting the boom which pivots on the frame and which provides for storage at the same time. The Publication No. 88469 structure is heavy and does not provide for storage of parts of the hoist when they are not in use.

OBJECTS

It is therefore an object of the present invention to provide an improved hoist assembly which has a frame which is relatively light-weight and strong. Further, it is an object of the present invention to provide a hoist assembly which provides a box for storage of parts of the hoist assembly. Further, it is an object of the present invention to provide a hoist assembly which is simple and economical to construct. These and other objects will become increasingly apparent by reference to the following description and the drawings.

BRIEF DESCRIPTION OF THE DRAWINGS

FIG. 10 is a left side view of the boom 62 alone as shown in FIG. 1 showing the mounting of the extension 64 within the distal end 62C of the boom 62.

FIG. 10A is a partial plan view of the boom 62 as shown in FIG. 10 showing the fourth lock pin assembly 88 mounted through the boom 62 and the extension 64.

FIG. 15 is an enlarged view of the box member 12 of the frame assembly 10 particularly showing the wiring for the hydraulic pump 43.

FIG. 15A shows an enlarged portion of FIG. 15 (dotted line) particularly showing the electrical connector 14 by bolts 20 connected to the wires 18A and 18B of the electrical conduit 18.

FIG. 21 is a top view of the underlift attachment 98 showing the arm 100, the extension 106, the cross member 112, the right and left extension 116 and 118, the right and left end bars 124 and 126 and the legs 128.

DESCRIPTION OF PREFERRED EMBODIMENTS

Figure 1:
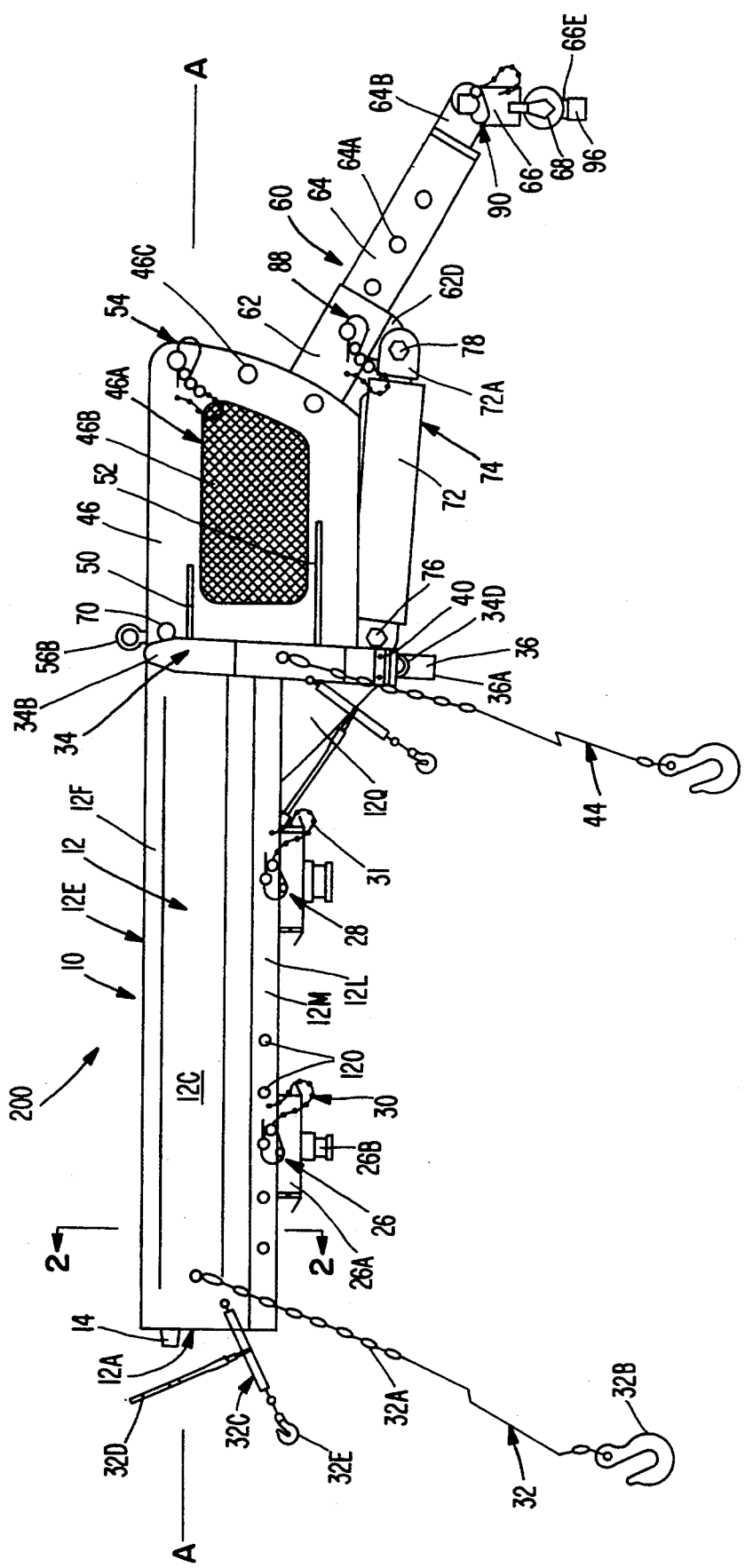
FIG. 1 is a left side view of the hoist apparatus of the present invention particularly showing the boom 62 in a lowered position.

The present invention relates to a hoist apparatus for lifting adapted for attachment to a truck bed which comprises: frame means having opposed ends for supporting the hoist apparatus and including a box member with an openable cover and opposed sides between opposed ends as part of the frame means, wherein the box member provides support for the frame means for the lifting; an attachment means mounted intermediate the ends of the frame means adapted for removably mounting the hoist apparatus on the truck bed; a boom means including means for the lifting having opposed sides and a distal end and a proximal end between the sides which is pivotally mounted for vertical movement at the proximal end of the boom means and at one of the ends of the frame means spaced from the attachment means; a hydraulic cylinder having opposed ends with one end pivotally mounted on the frame means and with the other end pivotally attached intermediate the distal and proximal ends of the boom means; and a hydraulic pump means mounted on the frame means and hydraulically connected to the hydraulic cylinder, wherein the box member provides for storage of a lift means for towing a vehicle to be removably mounted at the distal end of the boom means.

The present invention particularly relates to a hoist apparatus for lifting adapted for attachment to a fifth wheel of a tractor for a trailer which comprises: frame means including an elongate channel member having opposed ends, a box member having opposed ends with an openable cover providing a part of the frame means with the channel member mounted on the channel member, wherein the box member is mounted on the channel member so as to provide support for the lifting and a pair of vertically oriented extension plates having opposed ends with one end at one of the ends of the frame means; a kingpin assembly removably mounted intermediate the ends of the channel member with a removable first lock pin mounted in horizontally aligned holes between the channel member and the kingpin assembly for holding the kingpin assembly onto the channel member; a tubular boom member having opposed sides between a distal end and a proximal end which is pivotally mounted for vertical movement at the proximal end at one of the ends of the frame means spaced from the kingpin assembly and between the plates, wherein at the other of the ends of the plates a horizontally mounted second lock pin is mounted so that the boom can be supported in various vertical positions when not in use; a hydraulic cylinder having opposed ends with one end pivotally mounted on the frame means and with the other end pivotally attached intermediate the distal and proximal ends of the boom member to a flange with an opening on an underside of the boom member, wherein the other end of the hydraulic cylinder is adapted to be pivotally held in place in the flange on the underside of the boom member with a removable third lock pin in the opening in the flange; an extensible member telescopingly mounted inside the boom member along a length of each of the extensible and boom members, wherein the boom member and extensible member are provided with multiple openings along the lengths which mount a removable fourth lock pin for holding the extensible second member in position in the boom member; a hydraulic pump means mounted on the box member and hydraulically connected to the hydraulic cylinder; and securing means provided at the opposed ends of the frame means for attachment to the tractor to hold the kingpin in the fifth wheel of the tractor, wherein the box member provides for storage for a lift means for towing a vehicle to be removably mounted at the distal end of the boom means.

Figure 2:
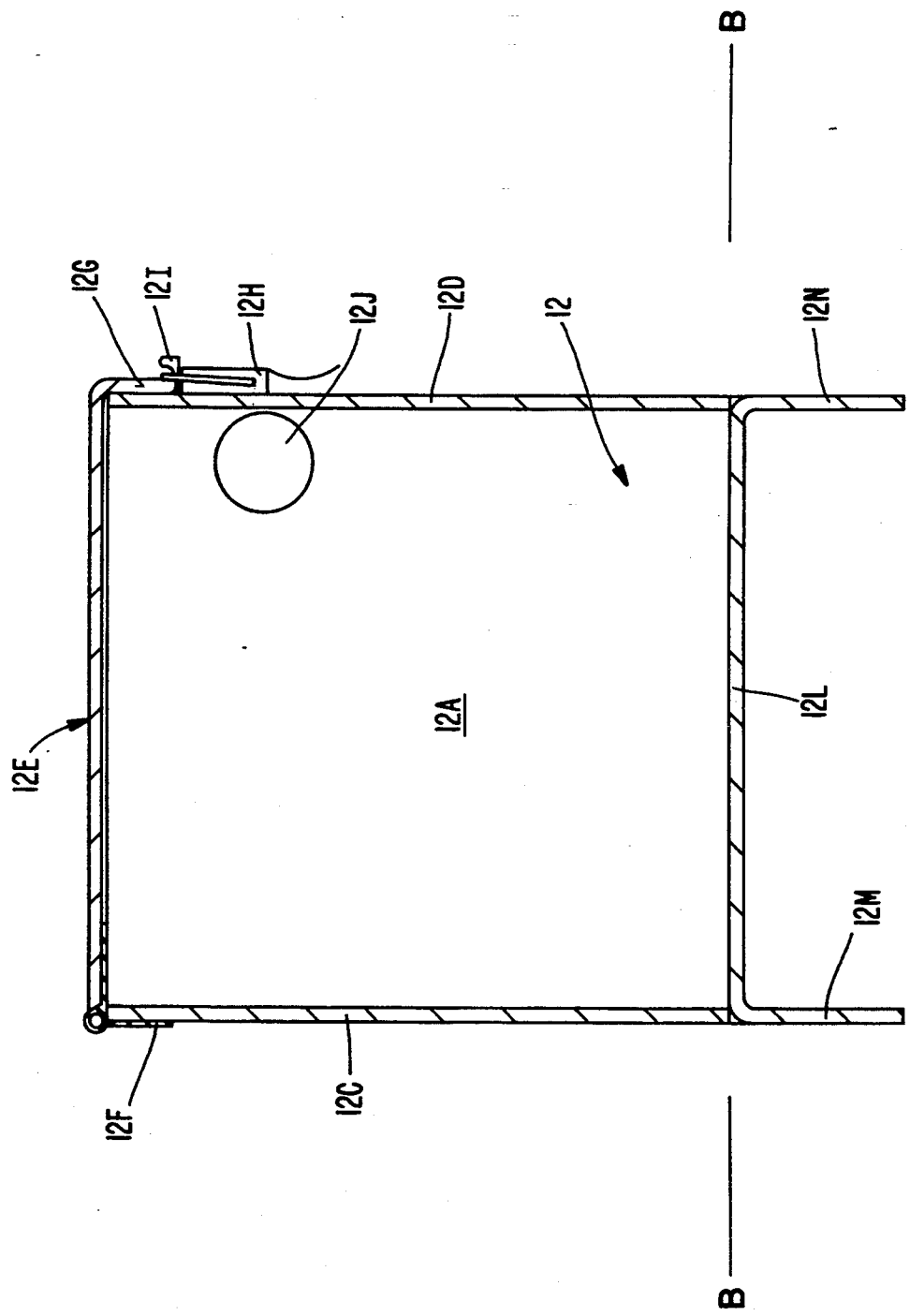
FIG. 2 is a cross-sectional view along line 2—2 of FIG. 1 of the frame 10 without the distal binder 32 and the electrical connector 14 showing the mounting of the box member 12 onto the channel member 12L.
Figure 3:
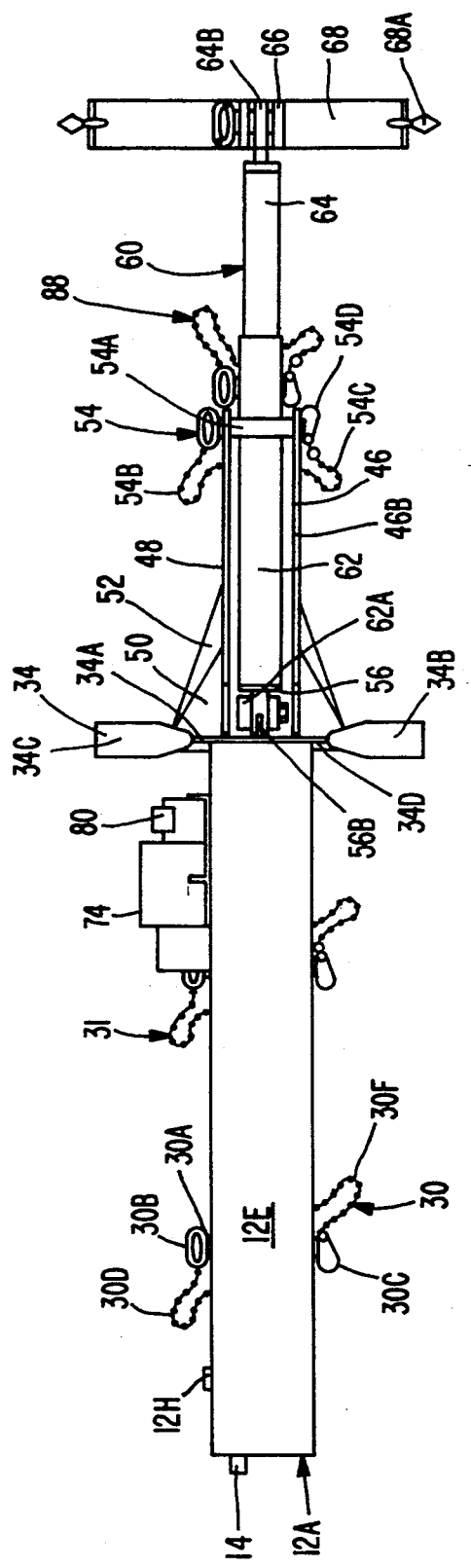
FIG. 3 is a top plan view of the hoist apparatus of FIG. 1.
Figure 4:
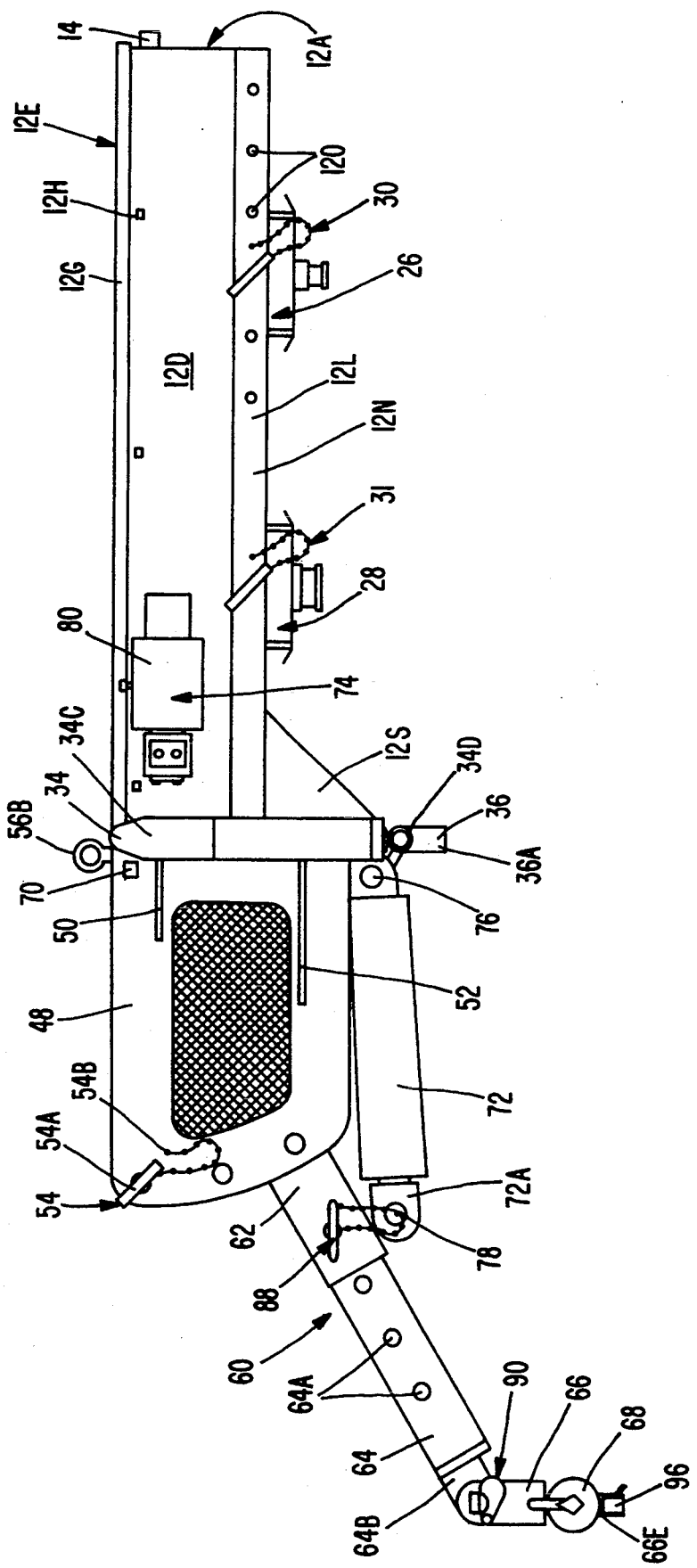
FIG. 4 is a right side view of the hoist apparatus of FIG. 1 showing the hydraulic pump assembly 74 mounted on the right sidewall of the box member.
Figure 7:
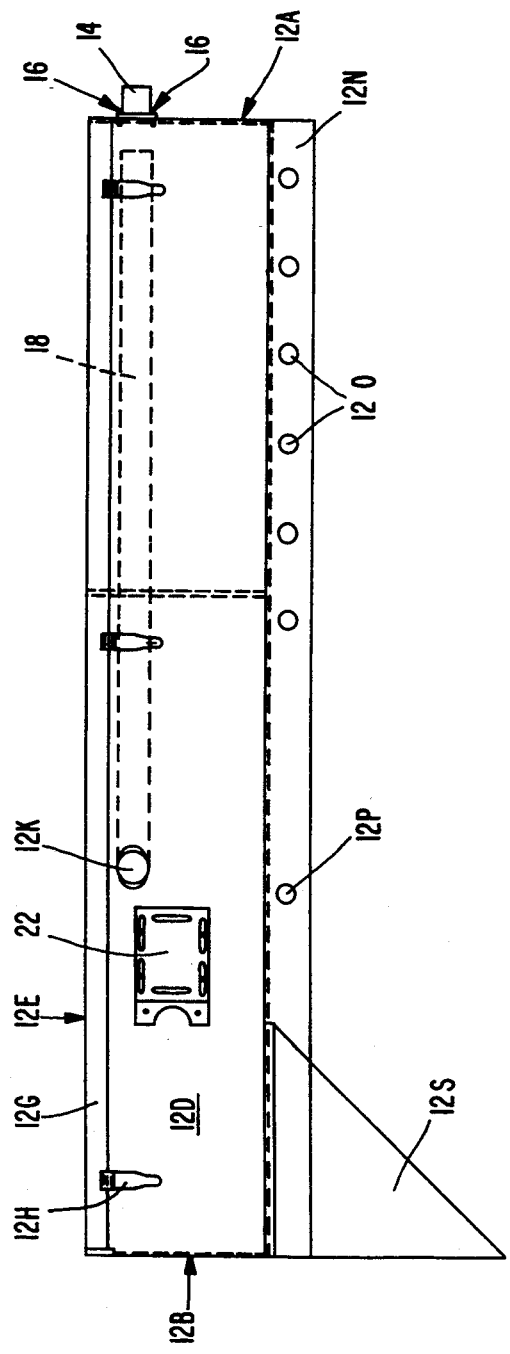
FIG. 7 is a right side view of the frame 10 alone as shown in FIG. 1 showing the mounting bracket, second hole and electrical conduit.

FIGS. 1, 3 and 4 show an improved hoist assembly 200 comprised of a frame assembly 10 and a boom assembly 60. The frame assembly 10 is comprised of a box member 12 and an end plate assembly 34 mounted at one end of the box member 12. As shown particularly in FIG. 7, the frame assembly 10 has a box member 12 which has a proximal end wall 12A and a distal end wall 12B with a left sidewall 12C and a right sidewall 12D therebetween. The box member 12 preferably has a rectangular shape and comprises the main body portion of the frame assembly 10. In the preferred embodiment, the interior of the box member 12 is also provided with a divider parallel to the axis B—B which splits the box member 12 into two smaller compartments. The top opening of the box member is closed by a cover 12E which in the closed position is perpendicular and adjacent to the top of the end walls 12A and 12B and the sidewalls 2C and 12D. As shown in FIG. 4, the cover 12E is attached to the box member 12 by hinges 12F. Preferably, the hinges 12F are mounted on the left sidewall 12C adjacent the top opening of the box member 12 such that to open the box member 12 the cover 12E is flipped upward pivoting around the hinges 12F on the left sidewall 12C. In the open position, the cover 12E extends outward from the left sidewall 12C in a direction opposite the right sidewall 12D and in a plane parallel to the top opening of the box member 12. Preferably, the cover 12E is constructed of a flat piece of metal having an L-shaped end 12G which is formed to curve over the top of the right sidewall 12D when the cover 12E is in the closed position. The right sidewall 12D is provided with hasps 12H located just below the L-shaped end 12G of the cover 12E when the cover 12E is in the closed position. The L-shaped end 12G of the cover 12E is provided with corresponding hooks 12I such that in the closed position, the hooks 12I of the cover 12E mate with the hasps 12H of the right sidewall 12D to securely close the cover 12E over the top opening of the box member 12 (FIG. 2). In the preferred embodiment, one of the hasps 12H is able to be provided with a lock (not shown) in order to lock the box member 12 (FIG. 7).

Figure 8:
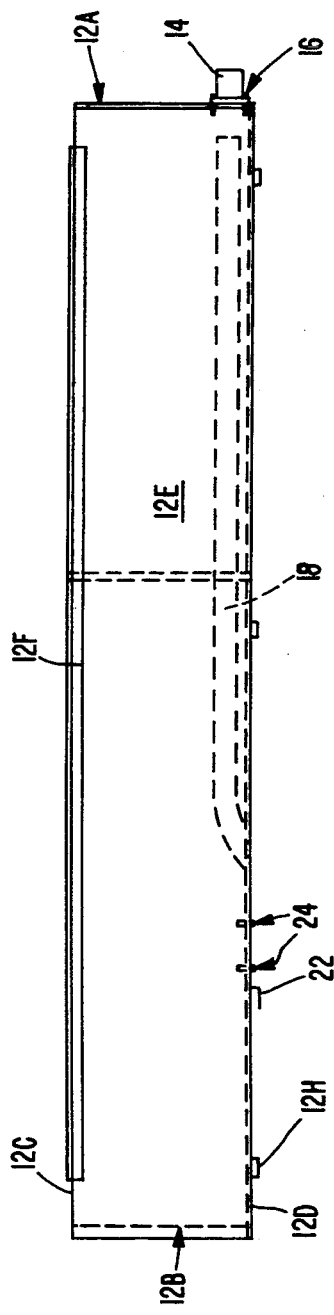
FIG. 8 is a top plan view of the frame assembly 10 alone as shown in FIG. 1.
Figure 9:
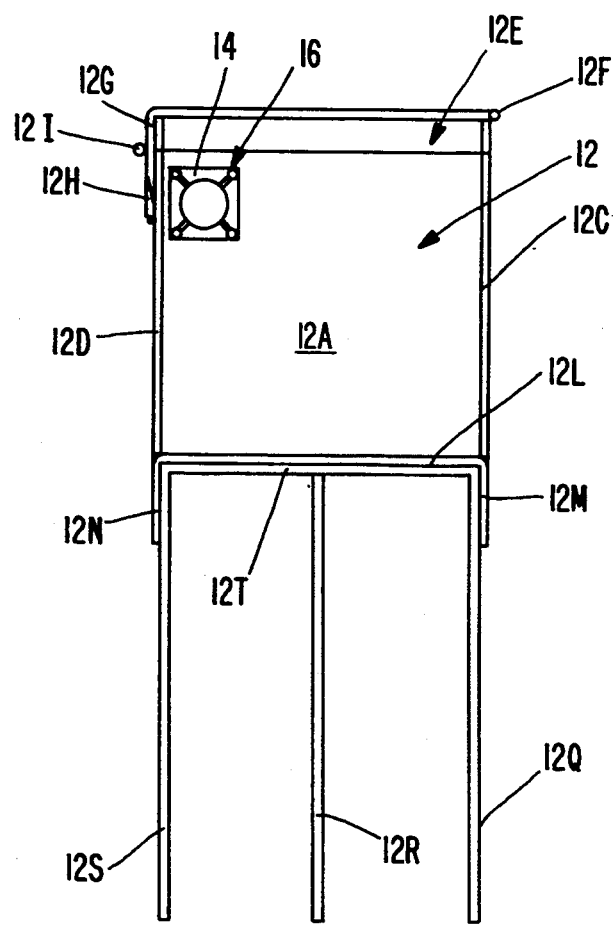
FIG. 9 is an end view of the frame 10 shown in FIG. 7 showing the three rear gussets and the welding plate 12T.

As shown in FIG. 2, the proximal end wall 12A of the box member 12 is provided with a first hole 12J through which is mounted an electrical connector 14. The electrical connector 14 is secured to the outside of the proximal end wall 12A by a pair of nuts and bolts 16 (FIGS. 7, 8, and 9). The electrical connector 14 is connected on one side to an electrical source (not shown), preferably, the electrical system of the towing vehicle (not shown). The other side of the electrical connector 14 extends through the first hole 12J into the inside of the box member 12 and is connected to an electrical conduit 18. The electrical conduit 18 is comprised of wires 18A and 18B which are connected to the electrical connector 14 by bolts 20 (FIG. 15A) which extend through the ends of the wires 18A and 18B and through the end of the electrical connector 14 which extends into the interior of the box member 12. The electrical conduit 18 extends from the electrical connector 14 along the interior of the right sidewall 12D of the box member 12 to a second hole 12K located in the right sidewall 12D of the box member 12 (FIG. 15). A mounting bracket 22 is mounted on the outside of the right sidewall 12D of the box member 12 near the distal end wall 12B of the box member 12. In the preferred embodiment, the bracket 22 is located on the right sidewall 12D adjacent the second hole 12K and is secured to the right sidewall 12D by a pair of nuts and bolts 24 (FIG. 8). The bracket 22 is provided to mount a hydraulic pump assembly 74 which raises and lowers the boom 62 of the boom assembly 60 during use of the hoist assembly 200 (FIG. 4) (to be discussed in detail hereinafter). The hydraulic pump assembly 74 is provided with a pump 80 which is connected to the end of the wires 18A and 18B of the electrical conduit 18, opposite the electrical connector 14. Thus, power is supplied to the pump 80 of the hydraulic pump assembly 74 from the towing vehicle in order to enable the boom 62 of the hoist assembly 200 to lift the disabled vehicle (not shown).

The box member 12 is mounted on a channel member 12L which extends the entire length of the box member 12 and forms the bottom of the box member 12. As shown in FIG. 2, channel member 12L is preferably U-shaped having legs 12M and 12N which extend outward in a direction opposite from the box member 12 in a plane parallel to the right and left sidewalls 12D and 12C of the box member 12. The channel member 12L is preferably constructed of a sheet metal similar to that used to construct the box member 12. The legs 12M and 12N of the channel member 12L are provided with first holes 120 and second holes 12P, parallel to the axis B—B. The first and second holes 120 and 12P of the channel member 12L allow for mounting of the first kingpin assembly 26 and the second kingpin assembly 28 onto the frame assembly 10. The first holes 120 are located toward to proximal end wall 12A of the box member 12 and the second holes 12P are spaced apart from the first holes 120, toward the distal end wall 12B of the box member 12. The first holes 120 of the channel member 12L are comprised of a plurality of hole sets spaced along the legs 12M and 12N of the channel member 12L. The plurality of first holes 120 enables the first kingpin assembly 26 to be mounted at different locations along the channel member 12L. The second holes 12P are comprised of a single hole set, the location of which allows for storage of the second kingpin assembly 28 away from the first kingpin assembly 26. It is understood that if the second kingpin assembly 28 is being used for mounting the hoist assembly 200, the first kingpin assembly 26 would be mounted in the second holes 12P to allow for storage of the first kingpin assembly 26. Although the preferred embodiment uses a kingpin assembly 26 or 28 for mounting the hoist assembly 200 onto a fifth wheel of the towing vehicle, it is understood that the hoist assembly 200 can be mounted onto a towing vehicle with or without a fifth wheel using other means such as a U-shaped frame (not shown).

Figure 11:
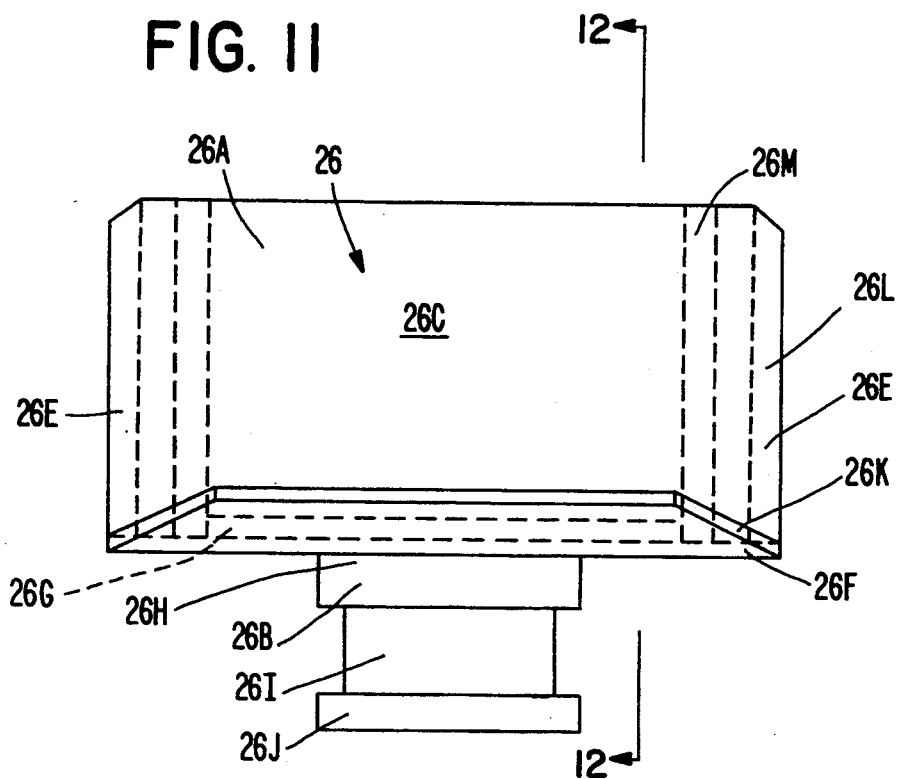
FIG. 11 is an end view of the first kingpin assembly 26 shown in FIG. 1 showing the first, second and third cylinder 26H, 26I and 26J of the kingpin 26B mounted onto the bottom wall 26F of the base 26A.
Figure 12:
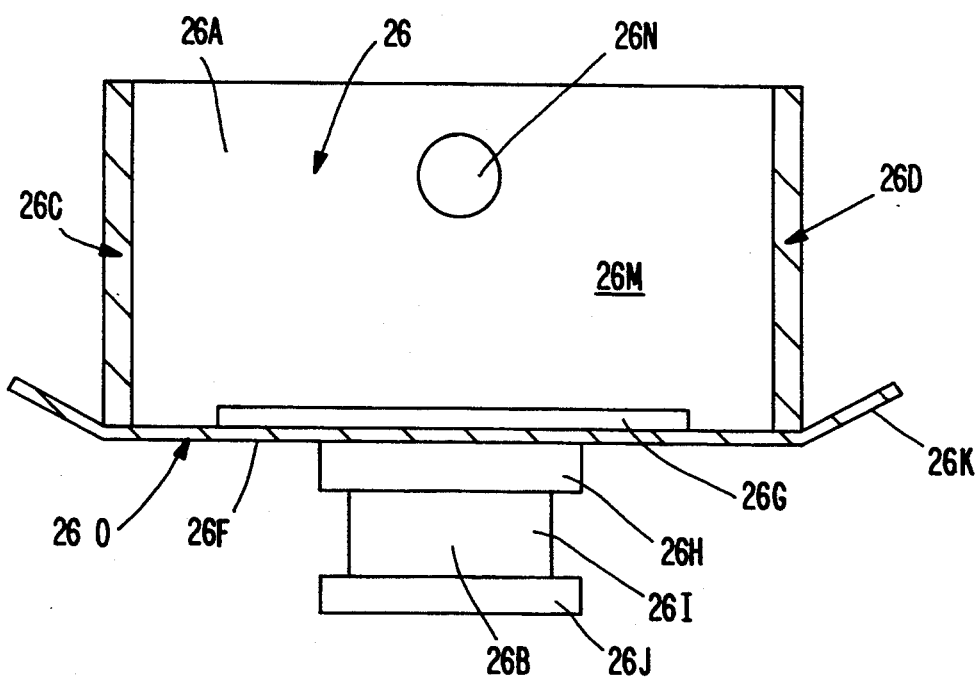
FIG. 12 is a cross-sectional view of the kingpin assembly 26 shown along the line 12—12 in FIG. 11 showing the bottom support 26G, the flanges 26K, the hole 26N and the drain hole 26O.
Figure 13:
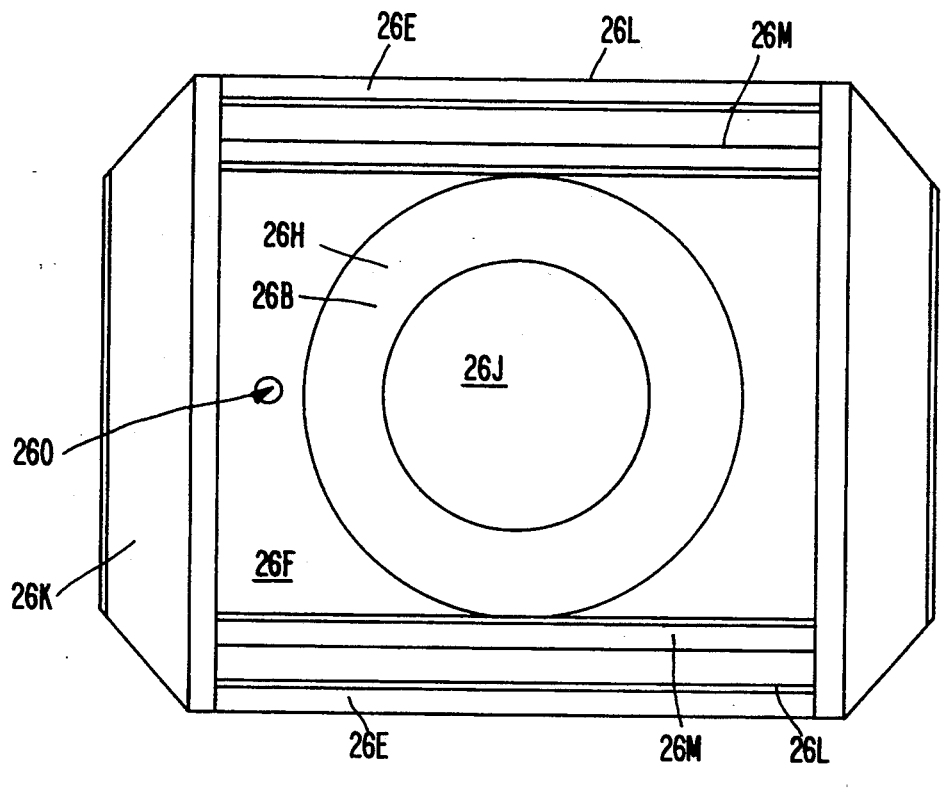
FIG. 13 is a top plan view of the kingpin assembly 26 shown in FIG. 1 showing the outer and inner walls 26L and 26M of the sidewalls 26E and drain hole 26O.

FIGS. 11 to 13 show the preferred embodiment of the first kingpin assembly 26. The first kingpin assembly 26 is comprised of a base 26A and a kingpin 26B. The base 26A is preferably square in shape and is formed by a front wall 26C and a backwall 26D with two sidewalls 26E therebetween and a bottom wall 26F. The kingpin 26B is mounted onto the bottom wall 26F and extends outward from the bottom wall 26F in a direction perpendicular and opposite to the base 26A of the kingpin 26B. Preferably, the kingpin 26B is mounted onto the bottom wall 26F of the kingpin assembly 26 by welding. A bottom support 26G is provided on the bottom wall 26F of the kingpin assembly 26 on the side opposite the kingpin 26B to increase the strength of the bottom wall 26F beneath the kingpin 26B to further support the kingpin 26B after mounting (FIG. 12). Preferably, the bottom support 26G is smaller in area than the bottom wall 26F but of a size as to completely cover the portion of the bottom wall 26F to which the kingpin 26B is mounted. In the preferred embodiment, the bottom support 26G is constructed of a metal similar to that used for the bottom wall 26F of the kingpin assembly 26. The kingpin 26B of the first kingpin assembly 26 is preferably comprised of a first cylinder 26H, a second cylinder 26I and a third cylinder 26J formed together and sharing a similar axis. In the preferred embodiment as seen in FIG. 12, the three cylinders 26H, 26I and 26J forming the kingpin 26B have varying diameters. Preferably, the first cylinder 26H is mounted adjacent the bottom wall 26F of the kingpin assembly 26 and has a diameter smaller than the length of the bottom wall 26F of the base 26A such that the first cylinder 26H easily fits within the perimeter of the bottom wall 26F of the base 26A. The second cylinder 26I is formed on the end of the first cylinder 26H opposite the bottom wall 26F of the base 26A and has a diameter smaller than the first cylinder 26H. The third cylinder 26J is located farthest from the bottom wall 26F of the kingpin assembly 26 and is formed onto the second cylinder 26I on the end opposite the first cylinder 26H. The third cylinder 26J has a diameter larger than the second cylinder 26I but smaller than the first cylinder 26H. The arrangement of the three cylinders 26H, 26I and 26J by varying diameters enables the kingpin 26B to be used for mounting the hoist assembly 200 onto the fifth wheel of the towing vehicle. The cylindrical nature of the kingpin 26B allows the hoist assembly 200 to pivot around the axis of the kingpin 26B. Thus, enabling the towing vehicle to make turns while the disabled vehicle is attached. Preferably, the kingpin 26B is constructed of solid metal of a type similar to the base 26A of the kingpin assembly 26.

The bottom wall 26F of the base 26A of the first kingpin assembly 26 is provided with flanges 26K on the sides adjacent the front and back walls 26C and 26D of the base 26A. The flanges 26K extend beyond the front and back walls 26C and 26D of the kingpin assembly 26 and are angled upward away from the plane of the bottom wall 26F. The angling of the bottom flanges 26K allows for easier mounting of the kingpin 26B into the fifth wheel (not shown) of the towing vehicle. The sidewalls 26E of the base 26A are mounted flush with the other sides of the bottom wall 26F such that the bottom wall 26F does not extend beyond the sidewalls 26E. The bottom wall 26F of the base 26A of the kingpin assembly 26 is also provided with a drain hole 260 to prevent damage to the first kingpin assembly 26 due to trapped fluids.

As shown in FIG. 13, the sidewalls 26E of the first kingpin assembly 26 are provided with an outer wall 26L and an inner wall 26M. The outer wall 26L of the sidewalls 26E is mounted along the outside edge of the bottom wall 26F. The inner wall 26M is mounted parallel to and spaced apart from the outer wall 26L in a direction toward the opposite outer wall 26L. In the preferred embodiment, the inner and outer walls are provided with a beveled inner edge (FIG. 13). The spaced apart outer and inner walls 26L and 26M provide added strength to the base of the kingpin assembly 26. Each sidewall 26E has a hole 26N which extends through the outer wall 26L and inner wall 26M and is located above and parallel to the bottom wall 26F of the kingpin assembly 26. The hole 26N of the first kingpin assembly 26 and the first holes 120 of the channel member 12L preferably have the same diameter and are located such that when the first kingpin assembly 26 is mounted between the legs 12M and 12N of the U-shaped channel 12, the hole 26N of the first kingpin assembly 26 and the holes 12O of the channel member 12L are in line. The first kingpin assembly 26 is secured between the legs 12M and 12N of the channel member 12L by a first lock pin assembly 30. The first lock pin assembly 30 is preferably comprised of a pin 30A having a handle 30B at one end and a snap link 30C to be secured within a hole (not shown) in the other end of the pin 30A. The pin 30A of the first lock pin assembly 30 extends through one leg 12N of the channel member 12L through the hole 26N in the sidewalls 26E of the base 26A of the first kingpin assembly 26 and through the opposite leg 12M of the channel member 12L. The outer and inner walls 26L and 26M of the sidewalls 26E allow for further support and distribution of weight of the first kingpin assembly 26 along the pin 30A which secures the first kingpin assembly 26 within the channel member 12L. Preferably, the horizontal axis of the hole 26N of the sidewalls 26E intersects the vertical axis of the kingpin 26B thus locating the pin 30A directly in line with the center of the first kingpin 26B. This ensures that the pin 30A securing the first kingpin assembly 26 within the channel member 12L is used to its optimum strength due to its placement directly over the center of the kingpin 26B. The diameter of the pin 30A of the first lock pin assembly 30 is preferably slightly less than the diameter of the hole 26N of the kingpin assembly 26 and the first holes 12O of the channel member 12L, thus the pin 30A is easily inserted through the holes 26N and 12O to allow for easier mounting of the first kingpin assembly 26 within the channel member 12L. A chain 30D is attached at one end to the handle 30B of the pin 30A and at the opposite end to channel member 12L (FIG. 4). The chain 30D prevents the pin 30A from being lost during movement of the kingpin assembly 26. After insertion of the pin 30A through the holes 12O of the channel member 12L and the hole 26N of the first kingpin assembly 26, the pin 30A is secured into place by the snap link 30C inserted through the hole in the pin 30A. The snap link 30C is also attached to the channel member 12L by means of a chain 30F similar to the method used to attach the pin 30A to the channel member 12L.

The height of the sidewalls 26E of the first kingpin assembly 26 are such that when mounted within the channel member 12L, the sidewalls 26E of the first kingpin assembly 26 extend downward past the legs 12M and 12N of the channel member 12L. Thus, when the hoist assembly 200 is mounted onto the vehicle via the first kingpin assembly 26, the extension of the sidewalls 26E of the kingpin assembly 26 below the legs 12M and 12N of the channel member 12L allows the channel member 12L of the frame assembly 10 to be spaced above the towing vehicle. Consequently, the frame assembly 10 of the hoist assembly 200 is only in contact with the towing vehicle at the first kingpin assembly 26 and the end plate assembly 34 (to be described hereinafter). The spacing between the towing vehicle and the frame assembly 10 of the hoist assembly 200 prevents extraneous contact between the frame assembly 10 and the towing vehicle which could hinder easy pivoting of the hoist assembly 200 on the towing vehicle.

A second kingpin assembly 28 is provided to allow for mounting of the hoist assembly 200 onto towing vehicles having a variety of sizes of fifth wheels. The second kingpin assembly 28 is mounted onto the second holes 12P of the channel member 12L by a second lock pin assembly 31 similar to the first lock pin assembly 30. The mounting of the second lock pin assembly 28 on the channel member 12L allows the second kingpin assembly 28 to be readily available for use without interfering with the hoist assembly 200 when not being used. In particular, the second kingpin assembly 28 does not come in contact with the towing vehicle when the first kingpin assembly 26 is connected to the fifth wheel of the towing vehicle. Storage of the second kingpin assembly 28 on the channel member 12L of the hoist assembly 200 prevents inadvertent loss of the second kingpin assembly 28 and allows onsite changing of the first kingpin assembly 26, if needed. The second kingpin assembly 28 is similar in construction and configuration to the first kingpin assembly 26. The second kingpin assembly 28 differs from the first kingpin assembly 26 in the size of the diameters of the cylinders of the kingpin 26B. In the preferred embodiment, the diameters of the cylinders of the second kingpin assembly 28 are larger than the diameters of the corresponding cylinders of the first kingpin assembly 26. It is understood that the diameters of the kingpins 26B of the first and second kingpin assemblies 26 and 28 can be of any size depending upon the size of the fifth wheels of the towing vehicle to be used. In the preferred embodiment, the diameters of the two kingpins 26 and 28 correspond to the two most widely used fifth wheel configurations, although, it is understood that kingpins with any size diameter may be substituted. The presence of the second kingpin assembly 28 increases the versatility and convenience of the hoist assembly 200.

As shown in FIG. 9, the frame member 10 is provided with three rear gussets 12Q, 12R and 12S located adjacent the distal end wall 12B of the frame member 10 between the legs 12M and 12N of the channel member 12L. The rear gussets 12Q, 12R and 12S preferably have the shape of a right triangle, having the sides which form the 90° angle adjacent the channel member 12L and the end plate assembly 34 (FIGS. 3 and 7) (to be discussed in detail hereinafter). The side of the rear gussets 12Q, 12R and 12S adjacent the end plate assembly 34, is preferably of a length so as to span the entire length of the end plate assembly 34 which extends downward past the legs 12M and 12N of the channel member 12L. As shown in FIG. 7, a welding plate 12T is provided between the channel member 12L and the gussets 12Q, 12R and 12S to provide added strength for mounting the gussets 12Q, 12R and 12S. The rear gussets 12Q, 12R and 12S provide support for the frame assembly 10 and are preferably constructed from metal and are welded onto the channel member 12L and the face plate 34A.

The right and left sidewalls 12D and 12C of the box member 12 adjacent the proximal end wall 12A are provided with a left and right binder 32 (one shown) for securing the hoist assembly 200 onto the towing vehicle. The first binder 32 is preferably similar and therefore only the left first binder 32 will be described. The first binder 32 consists of a binder chain 32A having a binder hook 32B and a ratchet binder 32C having a ratchet handle 32D and a ratchet hook 32E. Preferably, the binder chain 32A is adjustably mounted onto the left sidewall 12C below the hinge 12F near the proximal end 12A of the frame assembly 10. The end of the ratchet binder 32C, opposite the ratchet hook 32E, is connected to the first link of the binder chain 32A. Preferably, the length of the ratchet binder 32C is such as to allow the ratchet hook 32E to be easily attached to the towing vehicle and to allow the ratchet binder 32C to be tightened such that the frame assembly 10 is securely mounted onto the towing vehicle. The remaining length of the binder chain 32A is such as to allow the chain to be loosely secured to the towing vehicle by means of the binder hook 32B. The binder 32 is preferably similar to that used by other hoist assemblies 200 and is thus well known in the art.

An end plate assembly 34 is mounted onto the distal end wall 12B of the box member 12 and is comprised of a face plate 34A, capped on either side by a cap member 34B and 34C and having a tube 34D along the bottom of the face plate 34A and the cap members 34B and 34C. In the preferred embodiment, the distal end wall 12B of the box member 12 is formed by the face plate 34A of the end plate assembly 34. The end plate assembly 34 is mounted such that the top of the end plate assembly 34 is level with the top of the sidewalls 12C and 12D of the box member 12 while the bottom of the end plate assembly 34 extends adjacent to and beyond the legs 12M and 12N of the channel member 12L perpendicular to the axis A—A of the frame assembly 10. The cover 12E of the box member 12 extends adjacent to the top of the end plate assembly 34.

Figure 5:
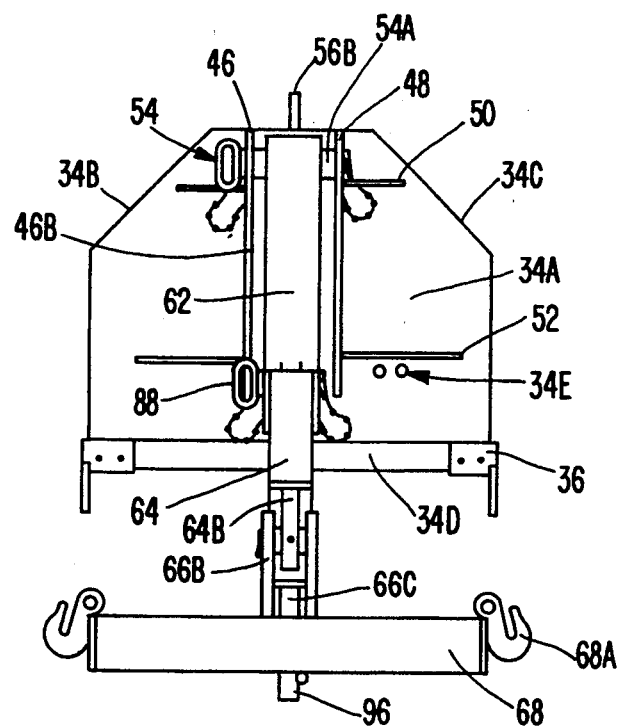
FIG. 5 is a front end view of the apparatus of FIG. 1 particularly showing the hose holes in the face plate 34A of the end plate assembly 34.
Figure 6:
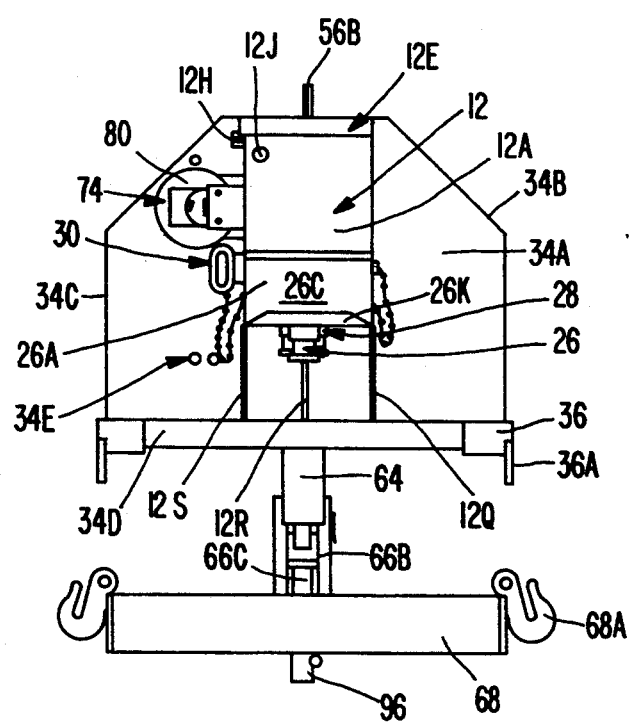
FIG. 6 is a back end view of the apparatus of FIG. 1 showing the first kingpin assembly 26 mounted in the channel member 12L and the pump of the hydraulic pump assembly mounted onto the right sidewall of the box member.

The face plate 34A of the end plate assembly 34, extends outward parallel to the axis B—B an equal distance on either side of the box member 12. Preferably, the top of the face plate 34A extends beyond the sidewalls 12C and 12D of the box member 12 less than the bottom of the face plate 34A. As shown in FIGS. 5 and 6, the sides of the face plate 34A begin to angle inward toward the sidewalls 12C and 12D of the box member 12 approximately two-thirds of the distance up the side of the face plate 34A. The cap members 34B and 34C of the end plate assembly 34 are mounted onto the sides of the face plate 34A perpendicular to the face plate 34A and parallel to the axis A—A of the frame assembly 10 and follow the angling of the face plate 34A. The cap members 34B and 34C are mounted such that an equal length of the cap member 34B and 34C extends outward on either side of the face plate 34A parallel to the axis B—B of the frame assembly 10. Preferably, the cap members 34B and 34C are welded onto the face plate 34A.

Figure 17:
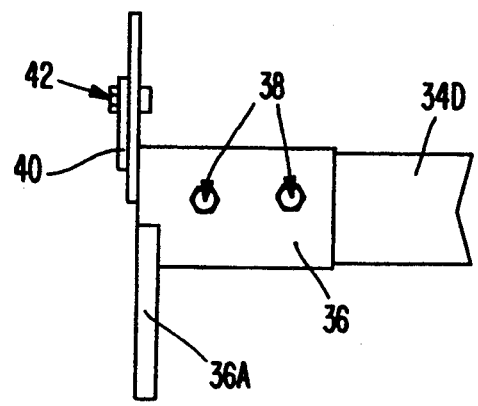
FIG. 17 is a partial sectional view of the spacing bracket 36 showing the stop plate 40 and the bolts 38 mounting the spacing bracket 36 onto the tube 34D.

In the preferred embodiment, the tube 34D of the end plate assembly 34 is welded along the bottom of the face plate 34A and is of a length such as to be flush with the cap members 34B and 34C of the end plate assembly 34. A left and right spacing bracket 36 (one shown) are mounted over both ends of the tube 34D of the end plate assembly 34 such as to also be flush with the end caps 34B and 34C. It is understood that the tube 34D and the spacing brackets 36 can extend beyond the end caps 34B and 34C of the end plate assembly 34, if necessary. The spacing brackets 36 have an extension 36A which extends downward beyond the tube 34D in a direction opposite the face plate 34A. When the hoist assembly 200 is mounted onto the towing vehicle, the extension 36A of the spacing bracket 36 rests upon the towing vehicle which allows for spacing of the frame assembly 10 of the hoist assembly 200 above and away from the towing vehicle. The extension 36A can be formed anywhere along the spacing bracket 36 depending upon the particular type of towing vehicle being used. As shown in FIG. 17, bracket 36 is bolted onto the tube 34D by bolts 38. A stop plate 40 is provided at the bottom of the cap members 34B and 34C in order to connect the cap members 34B and 34C to the spacing bracket 36. The stop plates 40 are mounted onto the cap members 34B and 34C by bolts 42 (FIG. 17).

The end plate assembly 34 is provided with a left and right second binder 44 (one shown). As shown in FIG. 1, the second binders 44 are attached to the cap members 34B and 34C of the end plate assembly 34 below the angled portion of the cap members 34B and 34C and the face plate 34A. The second binders 44 is preferably similar to the first binders 32 on the frame assembly 10 and further assist in securing the frame assembly 10 to the towing vehicle.

Figure 16:
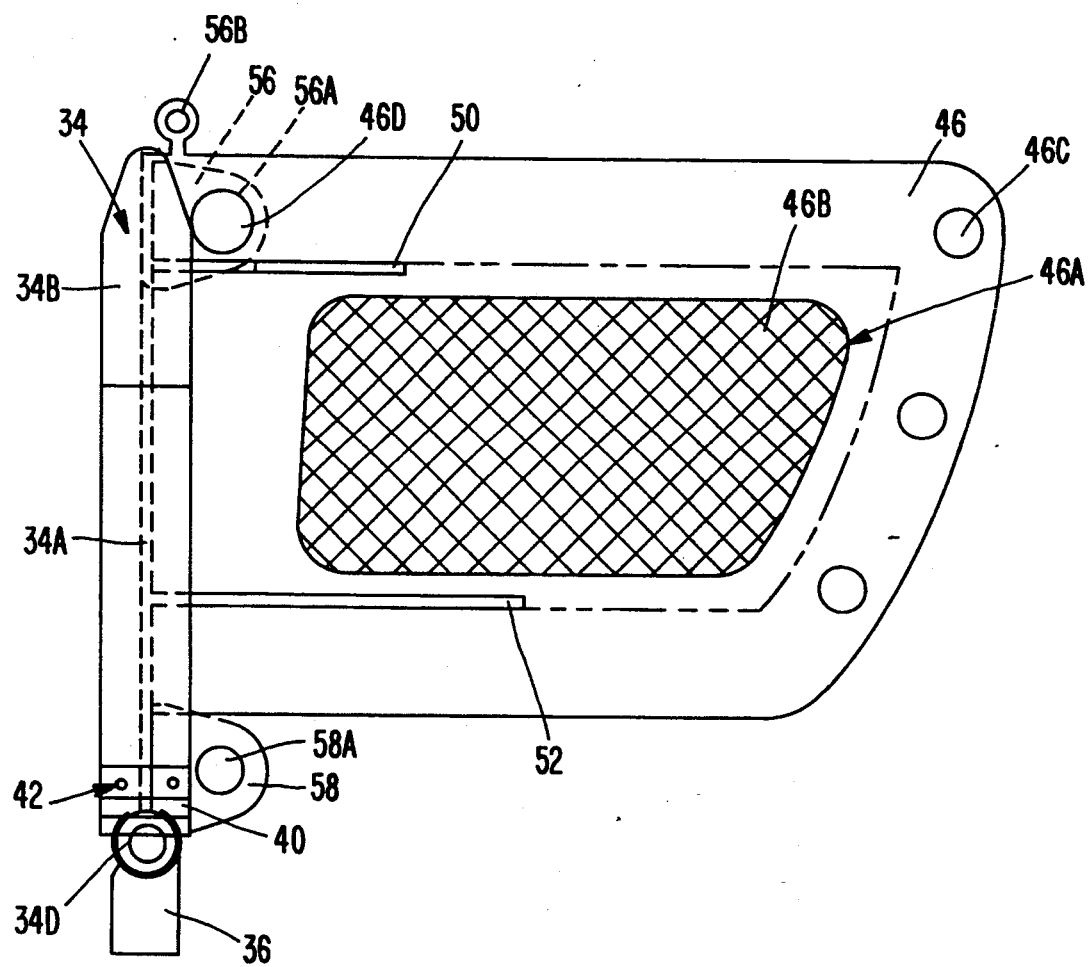
FIG. 16 is a left side view showing the left boom cover plates 10H construction and the first and second eyes 56 and 58 mounted on the face plate 34A of the end plate assembly 34.

A right boom cover plate 48 and left boom cover plate 46 are mounted onto the side of the face plate 34A opposite the box member 12 of the frame member 10. The boom cover plates 46 and 48 extend outward from the face plate 34A, parallel to the axis A—A (FIGS. 1 and 16). The cover plates 46 and 48 are mounted parallel to each other and spaced apart such as to accommodate the boom 62 (to be described in detail hereinafter). The boom cover plates 46 and 48 extend from the top of the face plate 34A of the end plate assembly 34 downward adjacent to the face plate 34A to a point spaced above the tube 34D attached to the bottom of the face plate 34A. As shown in FIG. 1, upper gussets 50 and lower gussets 52 are provided between the cap members 34B and 34C of the end plate assembly 34 and the right and left boom cover plates 48 and 46. The gussets 50 and 52 are mounted such as to form a 90° angle between the cover plates 46 and 48 and the face plate 34A. The upper gussets 50 are mounted toward the top of the face plate 34A and the lower gussets 52 are mounted toward the bottom of the face plate 34A. In the preferred embodiment, the upper gussets 50 are smaller in size than the lower gussets 52. The smaller size of the upper gussets 50 is partially due to the smaller size of the top portion of the face plate 34A.

The right and left cover plates 46 and 48 are identical mirror images of each other and only one will be described. As shown in FIG. 16, the cover plate 46 is preferably approximately rectangular in shape with the end opposite the face plate 34A having rounded covers with the top of the cover plate 46 being longer than the bottom of the cover plate 46. The cover plate 46 is provided with a center aperture 46A formed in the overall shape of the cover plate 46 such as to provide a border around the perimeter of the cover plate 46. A screen 46B is provided to cover the center aperture 46A of the cover plate 46 and is mounted onto the side of the cover plate 46 facing the opposite cover plate 46. The screen 46B is preferably larger in size than the center aperture 46A but smaller in size than the cover plate 46. The screen 46B is preferably constructed of a heavy metal mesh and is welded onto the cover plate 46. The screen 46B allows air to pass through the cover plates 46 and 48, thus preventing heat buildup and allowing easier removal of debris trapped between the cover plates 46 and 48 which may interfere with the movement of the boom 62.

The cover plate 46 is provided with openings 46C located in the end of the cover plate 46 opposite the face plate 34A and extending parallel to the axis B—B. The openings 46C are located in the border allowed by the center aperture 46A. The openings 46C allow for the inserting of a third lock pin assembly 54 similar to the first lock pin assembly 30, described previously. The pin 54A of the third lock pin assembly 54 extends between the right and left cover plate 46 and 48 and acts as a support for the boom 62 when the boom 62 is in the lifted position. In the preferred embodiment, the cover plate 46 is provided with three openings 46C which allows the boom 62 to be supported at three different levels of lift. In addition, the length of the chain 54B securing the pin 54A of the third lock pin assembly 54 and the length of the chain 54C securing the snap link 54D of the third lock pin assembly 54 are such as to allow the third lock pin assembly 54 to be positioned within any of the three openings 46C of the cover plates 46 and 48. The cover plate 46 is also provided with a hole 46D located in the top of the cover plate 46 in the end adjacent the face plate 34A of the end plate assembly 34 (FIG. 16). The hole 46D accommodates a pivot pin 70 which pivotably mounts the boom 62 onto a first eye 56 (to be described in detail hereinafter).

The end plate assembly 34 is also provided with a first eye 56 and a second eye 58 mounted onto the side of the face plate 34A opposite the box member 12, between the left and right cover plates 46 and 48. The eyes 56 and 58 extend outward from the face plate 34A parallel to the axis A—A. The eyes 56 and 58 are provided with holes 56A and 58A located in the end of the eyes 56 and 58 opposite the face plate 34A, parallel to the axis B—B. Preferably, the hole 56A of the first eye 56 is larger in diameter than the hole 58A of the second eye 58. This difference is due to the mounting of the boom 62 in the hole 56A of the first eye 56 and the mounting of the hydraulic cylinder 72 in the hole 58A of the second eye 58. The first eye 56 is preferably located adjacent to the top of the face plate 34A such that the eye 56 is flush with or slightly below the top of the cap members 34B and 34C and face plate 34A and the top of cover plates 46 and 48 (FIG. 16). The first eye 56 is mounted such that the hole 56A of the first eye 56 is in line with the hole 46D of the right and left cover plate 46 and 48. The second eye 58 is mounted similarly to the first eye 56, but is mounted near the bottom of the face plate 34A such that the bottom portion of the eye 56 is mounted onto the tube 34D of the end plate assembly 34 and such that the hole 58A of the second eye 58 is completely below the right and left cover plates 46 and 48. As shown in FIG. 16 in the preferred embodiment, a lifting eyelet 56B which extends above the frame assembly 10, and the cover plates 46 and 48, is perpendicular to the axis A—A. The eyelet 56B provides a means for lifting the hoist assembly 200 and is located such that the weight of the hoist assembly 200 is evenly distributed around the eyelet 56B.

Figure 14:
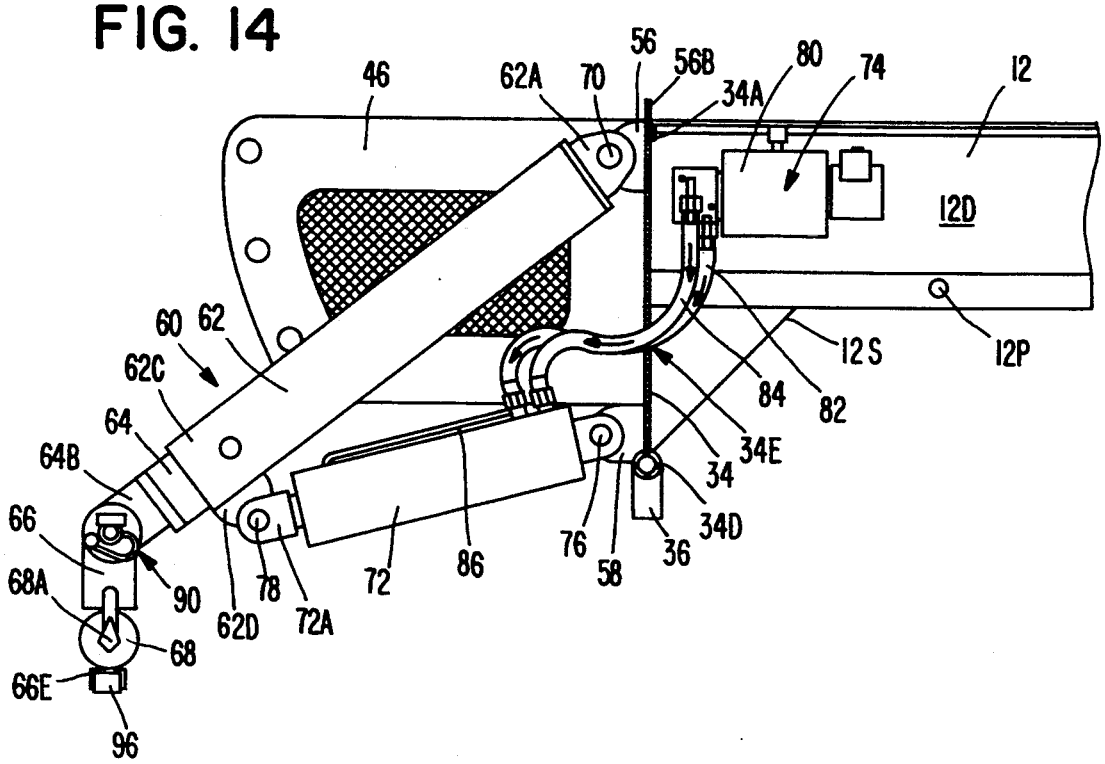
FIG. 14 is a partial left side view of the frame 10, boom 62 and hydraulic assemblies 74, particularly showing the hydraulic pump 80 and hoses 82 and 84 leading through the face plate 34A to the hydraulic cylinder 72.

As shown in FIG. 14, a boom assembly 60 is mounted on the frame assembly 10 by means of the first eye 56. The boom assembly 60 is comprised of a boom 62, an extension 64 attached to the boom 62, a cross member support 66 and a cross member 68. The boom 62 preferably has a tubular rectangular cross-section with the longest side of the rectangle forming the sides of the boom 62. The boom 62 has a split proximal end 62A having two spaced sides each having a hole 62B parallel to the axis B—B (FIG. 10). The split proximal end 62A of the boom 62 is positioned around the first eye 56 such that the first eye 56 is spaced between the split proximal end 62A of the boom 62. When correctly mounted, the hole 46D of the right and left cover plate 46 and 48, the holes 62B of the proximal split end 62A of the boom 62 and the hole 56A of the first eye 56 are aligned parallel to the axis B—B such as to accommodate the pivot pin 70. The pivot pin 70 is of a length such as to extend from one cover plate 46 through the boom 62 and eye 56 to the other cover plate 48 where it can then be secured in place. The pivot pin 70 preferably has a cylindrical shape and is of a diameter slightly less than the holes 46D, 62B and 56A of the cover plates 46 and 48, the proximal end 62A of the boom 62 and the first eye 56 to allow for easy insertion of the pivot pin 70. In addition, the pivot pin 70 must be of a diameter such as to allow the boom 62 to easily pivot around the pivot pin 70 yet not of diameters such as to allow excess movement of the boom 62 laterally on the pivot pin 70.

The distal end 62C of the boom 62 of the boom assembly 60 is provided with a flange 62D similar to the first and second eye 56 and 58 of the end plate assembly 34. The flange 62D is mounted on the bottom of the boom 62 such that the opening 62E of the flange 62D is parallel to the axis B—B and spaced downward from the bottom of the boom 62. The hydraulic cylinder 72 of the hydraulic pump assembly 74, is positioned between the second eye 58 of the end plate assembly 34 and the flange 62D of the boom 62 and enables the boom 62 is to be raised and lowered. The hydraulic cylinder 72 is attached to the boom 62, such that less outward movement is needed by the piston end 72A of the hydraulic cylinder 72 to raise the disabled vehicle. Both ends of the hydraulic cylinder 72 are split similar to the proximal end 62A of the boom 62 to allow the ends of the hydraulic cylinder 72 to be mounted onto the second eye 58 of the end plate assembly 34 and the flange 62D of the boom 62, similar to the mounting of the proximal end 62A of the boom 62 onto the first eye 56 of the end plate assembly 34. Removable pins 76 and 78 are inserted through the holes of the second eye 58 and flange 62D, respectively, for securing the ends of the hydraulic cylinder 72 in the second eye 58 and flange 62D. The hydraulic cylinder 72 is preferably mounted such that the piston end 72A of the hydraulic cylinder 72 is attached to the flange 62D of the boom 62. The hydraulic cylinder 72 is attached to the pump 80 of the hydraulic pump assembly 74 by means of hydraulic hoses 82 and 84. As shown in FIG. 14, the hydraulic hoses 82 and 84 extend from the pump 80 through holes 34E in the face plate 34A of the end plate assembly 34. The pump 80 forces fluid through the hydraulic hose 82 to push the piston end 72A of the hydraulic cylinder 72 outward in order to raise the boom assembly 60. A return line 86 allows the fluid of the hydraulic pump 74 to return through the hydraulic hose 84 to the pump 80 during contraction of the piston end 72A of the hydraulic cylinder 72. When the hydraulic cylinder 72 is in the fully compressed position (FIG. 1), the boom 62 of the boom assembly 60 is at its lowest position. As the piston end 72A of the hydraulic cylinder 72 is moved outward, the boom 62 is lifted upward. When the piston end 72A is fully extended, the boom 62 is at its highest position.

The extension 64 of the boom assembly 60 has a rectangular cross-section similar in shape to the boom 62 but smaller in area such that the extension 64 can be telescoped inside the boom 62. The boom 62 has a hollow interior to allow mounting of the extension 64 and a hole (not shown) in the distal end 62C of the boom 62 parallel to the axis B—B to allow for securing of the extension 64 within the boom 62. The extension 64 has a series of holes 64A extending through both sides of the extension 64 which can be matched up with the hole in the distal end 62C of the boom 62 for securing the extension 64 within the boom 62. The extension 64 is secured within the boom 62 by a fourth lock pin assembly 88, similar to the first lock pin assembly 30 as previously described. The multiple holes 64A along the side of the extension 64 allows the length of the extension 64 extending beyond the boom 62 to be varied. By varying the length of the extension 64, the height of the disabled vehicle off the ground can be varied. For instance, the shorter the length of the extension 64 beyond the boom 62, the higher the disabled vehicle would be lifted relative to the ground.

Figure 18:
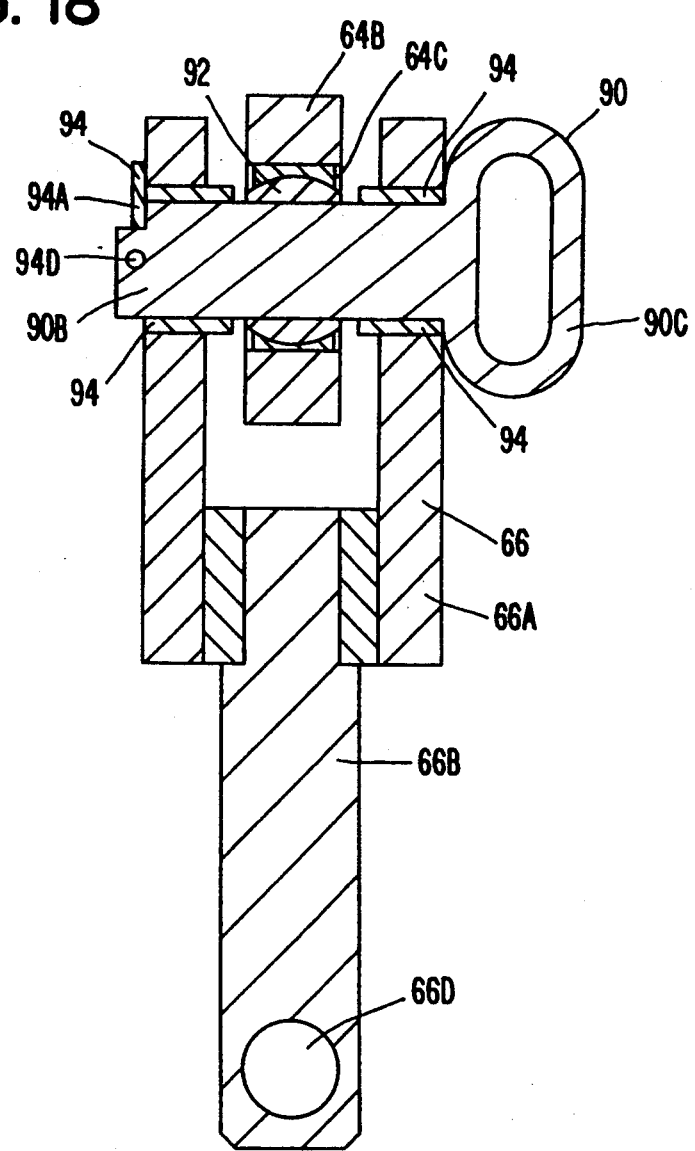
FIG. 18 is a cross-sectional view of the end member 64B of the extension 64 showing the ball bearing assembly 92 and the fifth lock pin assembly 90 and the yoke 66A and shaft 66B of the cross member support 66.

The extension 64 is also provided with an end member 64B extending outward from the end of the extension 64 opposite the boom 62 parallel to the axis A—A. The end member 64B is shaped similar to the first and second eyes 56 and 58 of the end plate assembly 34 and has a hole 64C parallel to the axis B—B (FIG. 10). As shown in FIG. 18, the hole 64C of the end member 64B is provided with a ball bearing assembly 92. A cross member support 66 is mounted onto the end member 64B of the extension 64. The member support includes a yoke 66A and a shaft 66B. The yoke 66A of the support member 66 is comprised of two pieces which act together to form a yoke 66A similar in shape to the split proximal end 62A of the boom 62. The top of the yoke 66A is provided with a hole 66C similar in diameter to the hole 64C in the end member 64B of the extension 64. The top of the yoke 66A of the support member 66 is mounted onto the end member 64B such that the two pieces of the yoke 66A surround the end member 64B and the holes 66C of the yoke 66A and the hole 64C of the end member 64B of the extension 64 are aligned. To secure the yoke 66A onto the end member 64B, a fifth lock pin assembly 90, similar to the first lock pin assembly 30 previously described, is inserted through the yoke 66A and the end member 64B. When properly mounted, the support member 66 extends downward from the end member 64B as shown in FIG. 18.

The ball bearing assembly 92 within the hole 64C of the end member 64B, increases the ease with which the yoke 66A of the support member 66 can rotate around the end member 64B of the extension 64. The ball bearing assembly 92 also allows the yoke 66A to move laterally within the hole 64C of the end member 64B. This allows for greater movement of the yoke 66A and thus the cross member support 66 and cross member 68 during attachment of the disabled vehicle. The ball bearing assembly 92 also reduces wear on the pin 90B of the fifth lock pin assembly 90 caused by extraneous movement of the disabled vehicle while the disabled vehicle is being towed. The hole 66C of the yoke 66A is also provided with spacers 94 which reduce the amount of lateral movement of the end member 64B within the yoke 66A. Once spacer 94 adjacent the snap link 90A, of the fifth lock pin assembly 90, is provided with a stop portion 94A which prevents the pin 90B of the fifth lock pin assembly 90 from extending past the stop member 94. In the preferred embodiment, the end of the pin 90B of the fifth lock pin assembly 90, opposite the handle 90C is notched to allow the end of the pin 90A to extend beyond the stop member 94 in order that the snap link 90A can be inserted into the hole 94D in the end of the pin 90B (FIG. 18). This special construction of the fifth lock pin assembly 90 ensures that the pin 90B will not rotate within the yoke 66A, thus all rotation of the support member 66 results from movement of the pin 90B in the hole 64C of the end member 64B of the extension 64 which is aided by the ball bearing assembly 92. This allows for easier and smoother movement of the cross member support 66 and decreases wear and tear on the yoke 66A.

Figure 19:
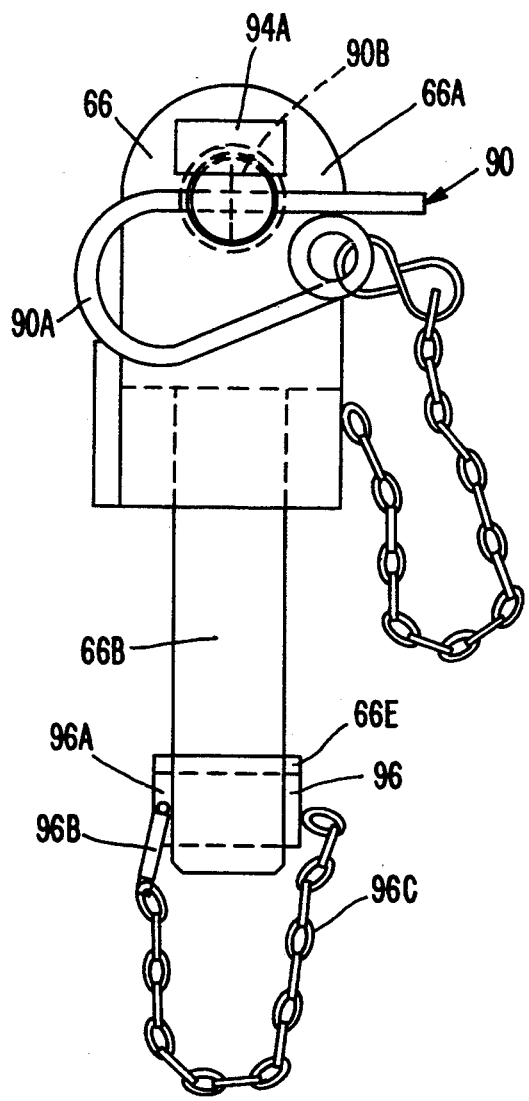
FIG. 19 is a right side view of the cross member support 66 shown in FIG. 20 particularly showing the snap link 90B of the fifth lock pin assembly 90 and the lock 96.

The shaft 66B of the support member 66 is mounted onto the end of the yoke 66A opposite the end member 64B. The end of the shaft 66B mounted in the yoke 66A preferably has a square cross-section and is solidly mounted into the end of the shaft 66B by welding. To assist in securing the shaft 66B within the yoke 66A, the bottom inside of each side of the yoke 6A is provided with a protrusion which narrows the distance between the two sides of the yoke 66A. The end of the shaft 66B opposite the yoke 66A preferably has a circular cross-section and is provided with a hole 66D extending through the shaft 66B parallel to the axis B—B. A cross member 68 is provided for mounting over the shaft 66B of the support member 66. The cross member 68 preferably has a circular cross-section and is provided with hooks 68A at either end. The cross member 68 is also provided with a hole (not shown) centered between the two ends of the cross member 68. The cross member 68 is mounted onto the shaft 66B by inserting the shaft 66B into the hole in the cross member 68. After mounting of the cross member 68 onto the shaft 66B, a collar 66E is mounted onto the shaft 66B below the cross member 68 and above the hole 66C of the shaft 66B (FIG. 19). A lock 96 is then inserted through the hole 68B in the distal end 62C of the shaft 66B to securely mount the cross member 68 onto the shaft 66B. The lock 96 consists of a pin 96A and a key 96B. A chain 96C is attached to one end to the pin 96A and at the other end to the key 96B. The pin 96A is inserted through the hole 66C of the shaft 66B and the key 96B is then inserted in a hole (not shown) in the end of the pin 96A opposite the chain 96C (FIG. 19). When properly mounted, the cross member 68 is parallel to the axis B—B and is centered around the shaft 66B of the support member 66. Chains (not shown) are provided on the ends of the cross member 68 adjacent the hooks to secure the cross member 68 to the axle of the disabled vehicle. The chains are removable and can be stored in the box member 12 of the frame assembly 10 when not in use.

Figure 20:
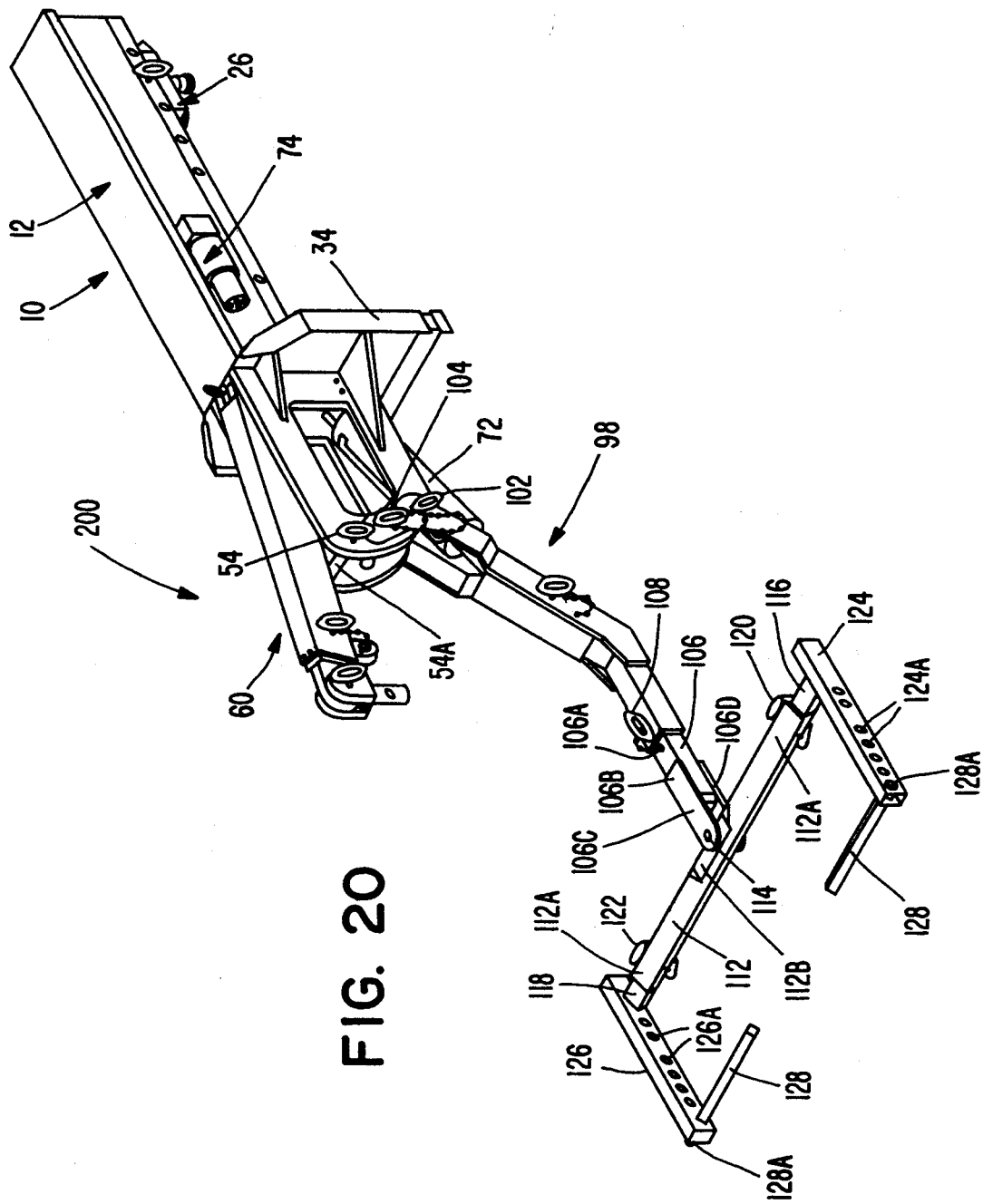
FIG. 20 is a right side view of the hoist assembly 200 particularly showing the underlift attachment 98.

In an alternate embodiment as shown in FIGS. 20 and 21, the boom assembly 60, preferably without the cross member 68, is detached from the piston end 72A of the hydraulic cylinder 72 and is moved upward toward t top of the cover plates 46 and 48 in order to be out of the way. The pin 54A of the third lock pin assembly 54 is placed in the top opening 46C of the cover plates 46 and 48 to support the boom 62 in the fully raised position. An underlift attachment 98 is provided to replace the boom assembly 60 and is comprised of an arm 100, an extension 106, a cross member 112, a right extension 116 and a left extension 118. The arm 100 is comprised of a proximal end 100A and a distal end 100B with a center portion 100C, therebetween. The piston end 72A of the hydraulic cylinder 72 is attached onto the center portion 100C of the arm 100 in a manner similar to attachment of the original boom assembly 60 to the hydraulic cylinder 72. The proximal end 100A is comprised of two parallel, spaced identical sides having a generally L-shaped configuration such as to follow the shape of the cover plates 46 and 48. The proximal end 100A is provided with holes (not shown) such that when the two sides of the proximal end 100A are placed adjacent to the sides of the cover plates 46 and 48 and the boom 62 is in the raised position, the holes of the proximal end 100A of the boom 100 are in line with the openings 46C of the cover plates 46 and 48. To secure the arm 100 onto the cover plates 46 and 48, a sixth lock pin assembly 102, similar to the first lock pin assembly 30 previously described, is inserted through the matching openings 46C of the cover plates 46 and 48 and arm 100. The proximal end 100A of the arm 100 is mounted such that when the piston end 72A of the hydraulic cylinder 72 is expanded, the proximal end 100A of the arm 100 pivots around the sixth lock pin assembly 102. To support the arm 100 in the raised position, a seventh lock pin assembly 104 is inserted through the middle opening 46C of the cover plates 46 and 48 and the top hole (not shown) of the proximal end 100A of the arm 100. When the proximal end 100A of the arm 100 is mounted onto the cover plates 46 and 48, the distal end 100B of the arm 100 extends downward and outward parallel to the axis A—A. The distal end 110B of the arm 100 is preferably similar to the boom 62 of the boom assembly 60 and has a tubular, generally rectangular cross-section. The distal end 100B of the arm 100 is shaped such that the extreme distal end 100B of the arm 100 extends only outward, parallel to the axis A—A.

An extension 106 is telescoped into the distal end 100B of the arm 100 and extends outward parallel to axis A—A similar to the mounting of the extension 64 within the original boom 62. The extension 106 is provided with a variety of holes 106A such that the length of the extension 106 protruding from the distal end 100B of the arm 100 can be adjusted depending upon which hole 106A is chosen (FIG. 20). To secure the extension 106 within the arm 100, an eighth lock pin assembly 108 is inserted through a hole (not shown) in the distal end 100B of the arm 100 and through the chosen hole 106A in the extension 106. The eighth lock pin assembly 108 is preferably similar to the first lock pin assembly 30 previously described. The end of the extension 106 opposite the arm 100 is provided with a yoke 106B having an upper arm 106C and lower arm 106D. The upper arm 106C of the yoke 106B is spaced above and parallel to the lower arm 106D such that the upper and lower arms 106C and 106D extend outward parallel to the axis A—A. A cross member 112 is mounted between the upper and lower arms 106C and 106D of the yoke 106B of the extension 106 and extends outward from the yoke 106B parallel to the axis B—B. The cross member 112 has hollow ends 112A with an indented center portion 112B therebetween. The cross member 112 has a diamond shaped cross-section and is provided with a hole (not shown) in the center portion 112 of the cross member 112 extending vertically through the diamond shaped cross member 112. The center portion 112B of the cross member 112 around the hole is indented to eliminate the vertical apex of the cross member 112. The cross member 112 is mounted onto the yoke 106B of the extension 106 such that the center portion 112B of the cross member 112 is between the upper and lower arms 106C and 106D of the extension 106 and the hole of the extension 106 is in line with the hole of the cross member 112. The indented center portion 112B of the cross member 112 allows for easier and firmer mounting of the cross member 112 within the yoke 106B of the extension 106. The cross member 112 is secured within the yoke 106B of the extension 106 by a pin 114.

A right extension 116 and a left extension 118 are telescoped within the hollow ends 112A of the cross member 112. The right and left extensions 116 and 118 preferably have a cross-section similar to that of the ends of the cross member 112 but are slightly smaller so as to be easily telescoped within the hollow ends 112A of the cross member 112. The right and left extensions 116 and 118 are secured within the cross member 112 by a ninth and tenth lock pin assembly 120 and 122 extending through the cross member 112 and the extensions 116 and 118. The ninth and tenth pin assemblies 120 and 122 are preferably similar to the first lock pin assembly 30 previously described. A right end bar 124 and a left end bar 126 are mounted onto the ends of the right and left extensions 116 and 118 opposite the cross member 112. The right and left end bars 124 and 126 are provided with a plurality of holes 124A and 126A extending parallel to the axis B—B (FIG. 20). The legs 128 having a generally square cross-section and a first end 128A having a circular cross-section are provided to be mounted in the holes 124A and 126A of the end bars 124 and 126. The first end 128A of the legs 128 are mounted into the holes 124A and 126A of the right and left end bars 124 and 126, respectively, and are secured into place by a first and second cotter pin 132 and 134, respectively, (FIG. 21). The plurality of holes 124A and 126A in the right and left end bard 124 and 126, allow for positioning of the legs 128 around the tire of the disabled vehicle independent of the tire size of the disabled vehicle.

IN USE

To mount the hoist assembly 200 onto the towing vehicle, the kingpin 26B of the first kingpin assembly 26 is positioned within the fifth wheel of the towing vehicle. Before mounting the hoist assembly 200 onto the towing vehicle, the kingpin 26B is adjusted along the length of the channel member 12L such that when the kingpin 26B is mounted within the fifth wheel, the spacing bracket 36 of the end plate assembly 34 is adjacent to and supported by the towing vehicle. Once the kingpin 26B is mounted within the towing vehicle, the distal binders 32 located on either side of the box member 12 of the frame assembly 10, are attached to the towing vehicle and tightened. Likewise, the binders 44 attached to the cap members 34B and 34C of the end plate assembly 34 are attached to the towing vehicle and tightened. Next, the boom 62 is placed in the lowest position, thus the piston end 72A of the hydraulic cylinder 72 is completely contracted. If necessary, the electrical connection between the hoist assembly 200 and the towing vehicle can be connected in order to operate the pump 80 to contract the piston end 72A of the hydraulic cylinder 72 and thus lower the boom 62 to the lowest position. The towing vehicle with the hoist assembly 200 attached and the boom assembly 60 in the lowest position is then positioned in front of the disabled vehicle such that the cross member 68 of the boom assembly 60 is adjacent and parallel to the front of the disabled vehicle. It is understood that the hoist assembly 200 would be positioned behind the disabled vehicle if the disabled vehicle had rear wheel drive. The extension 64 of the boom assembly 60 is then adjusted to accommodate the size and axle height of the disabled vehicle. It is understood that the shorter the extension 64 and boom 62 the higher the vehicle can be lifted off the ground. To attach the disabled vehicle to the cross member 68, the chains of the cross member 68 are positioned around the axle of the disabled vehicle and then secured onto the hooks 68A and at the end of the cross member 68. It is understood that the chains are connected to the front or rear axle of the disabled vehicle depending upon whether the disabled vehicle has front or rear-wheel drive. Once the disabled vehicle is secured to the hoist assembly 200, the hoist assembly 200 is then electrically connected to the electrical system (not shown) of the towing vehicle, through use of the electrical connector 14 mounted on the box member 12. It is understood that the electrical hookup between the hoist assembly 200 and the towing vehicle can be completed before attachment of the disabled vehicle onto the hoist assembly 200. Once the disabled vehicle is secured to the hoist assembly 200 and the electrical hookup is complete, the hydraulic cylinder 72 is activated and the boom 62 is lifted, thus raising one end and one set of wheels of the disabled vehicle off the ground. Once the disabled vehicle is of satisfactory height, the third lock pin assembly 54 can be inserted in the opening 46C in the cover plate 46 directly beneath the boom 62, thus providing support for the boom 62. Preferably, the boom 62 is raised until a hole 96C is available directly beneath the boom 62 in order to provide maximum support for the boom 62 in the raised position.

In the second embodiment, wherein the underlift attachment 98 is used, the hoist assembly 200 is similarly mounted onto the towing vehicle and the arm 100 is placed in the lowest position. The ninth and tenth pin assemblies 120 and 122 of the underlift attachment 98 secures the right and left extensions 116 and 118 within the cross member 112 are released and the extensions 116 and 118 are pulled outward parallel to the axis B—B, thus expanding the distance between the right and left end bars 124 and 126. It is understood that the extensions 116 and 118 are not pulled out so far as to detach either extension 116 or 118 from the cross member 112. The first and second cotter pins 132 and 134 are removed from the first ends 128A of the legs 128 and the legs 128 are removed from the end bars 124 and 126. The cross member 112 is then positioned adjacent and parallel to the axle of the disabled vehicle such that the end bars 124 and 126 are adjacent the outside of each tire. The legs 128 of the end bars 124 and 126 are placed around the wheels of the disabled vehicle and the first ends 128A are reinserted into the corresponding holes 124A and 126A. The cotter pins 132 and 134 are then replaced in the first ends 128A of the legs 128 to secure the posts 128 within the end bars 124 and 126. The distance between the securing post 128 and the cross member 112 is adjusted to accommodate the specific size of the disabled vehicle's tire. The extensions 116 and 118 are then contracted back into the cross member 112 such that the end bars 124 and 126 are adjacent to the tires of the disabled vehicle. The ninth and tenth pin assemblies 120 and 122 are then placed back into the cross member 112 and the extensions 116 and 118 to secure the end bars 124 and 126 and legs 128 in the desired position.

It is intended that the foregoing description is only illustrative of the present invention and that the present invention be limited only by the hereinafter appended claims.

I claim:

1. A hoist apparatus for lifting adapted for attachment to a truck bed which comprises:
    (a) frame means having opposed ends for supporting the hoist apparatus and including a box member with opposed sides between opposed ends as part of the frame means, said box member further including an openable cover including means to facilitate opening of the cover wherein the box member provides support for the frame means for the lifting;
    (b) an attachment means mounted intermediate the ends of the frame means adapted for removably mounting the hoist apparatus on the truck bed;
    (c) a boom means including means for the lifting, said boom means having opposed sides and a distal end and a proximal end between the sides of the boom means and which is pivotally mounted for vertical movement at the proximal end of the boom means and at one of the ends of the frame means, wherein said proximal end is spaced from the attachment means;
    (d) a hydraulic cylinder having opposed ends with one end pivotally mounted on the frame means and with the other end pivotally attached intermediate the distal and proximal ends of the boom means; and
    (e) a hydraulic pump means mounted on the frame means and hydraulically connected to the hydraulic cylinder, wherein the box member provides for storage of a lift means for towing a vehicle to be removably mounted at the distal end of the boom means.

2. The apparatus of claim 1 wherein the frame means includes a U-shaped channel which provides a bottom of the box member and having opposed legs with the legs directed away from the box member and having aligned holes through the legs which mount a lock pin and wherein the attachment means is a kingpin assembly which includes a kingpin mounted on a rectangularly shaped member having at least one hole for a lock pin mounted between the aligned holes of the legs of the channel to hold the kingpin assembly in place.

3. The apparatus of claim 1 wherein the frame means includes a support member adjacent the boom means which provides an end of the box member.

4. The apparatus of claim 3 wherein the frame includes a pair of vertically oriented plates mounted on the support member and which pivotally mount the boom means with horizontally aligned openings between the plates for selectively inserting a lock pin which selectively holds the boom means in a predetermined position when not in use.

5. The apparatus of claim 1 wherein a bottom of the box member of the frame means includes an elongate U-shaped channel with opposed legs with the legs directed away from the box member and wherein the attachment means is mounted on the channel.

6. The apparatus of claim 5 wherein the opposed sides of the box member are mounted adjacent to the legs of the U-shaped channel to provide the frame means.

7. The apparatus of claim 3 wherein the hydraulic cylinder is mounted on the support member below the boom means.

8. The apparatus of claim 3 wherein cap members are mounted on opposed sides of the support member as part of the frame means.

9. The apparatus of claim 4 wherein said boom means further includes a vehicle underlift attachment including an arm which is pivotally mounted by a removable second lock pin between two of the horizontally aligned openings in the pair of the plates and wherein the hydraulic cylinder is pivotally attached to the arm.

10. The apparatus of claim 9 wherein the underlift attachment has a cross member having opposed ends, said cross member being attached to the arm intermediate the ends of the cross member, and extensions attached to the opposed ends of the cross member for supporting tires of a towed vehicle.

11. The apparatus of claim 10 wherein the extensions are L-shaped, each extension including two legs, wherein one of the legs of each of the extensions face each other and wherein the legs include means to position the legs relative to the cross member to accommodate tires of different towed vehicles.

12. The apparatus of claim 1 wherein the boom means is a tubular boom member with an extensible member telescopingly mounted inside the boom member along a length of each of the extensible and boom members and wherein securing means is provided for selectively holding the extensible member and the boom member in a preselected position.

13. A hoist apparatus for lifting adapted for attachment to a fifth wheel of a tractor for a trailer which comprises:

(a) frame means having opposed ends and including an elongate channel member having opposed ends, a box member having opposed ends with an openable cover including means to facilitate opening of the cover, said box member providing a part of the frame means with the box member mounted on the channel member, wherein the box member is mounted on the channel member so as to provide support for the lifting, and a pair of vertically oriented extension plates having opposed ends with one end of each of the plates at one of the ends of the frame means;

(b) a kingpin assembly removably mounted intermediate the ends of the channel member with a removable first lock pin mounted in horizontally aligned holes between the channel member and the kingpin assembly for holding the kingpin assembly onto the channel member;

(c) boom means including a tubular boom member having opposed sides between a distal end and a proximal end and which is pivotally mounted for vertical movement at the proximal end at one of the ends of the frame means, wherein said proximal end is spaced from the kingpin assembly and between the plates, wherein at the other of the ends of the plates a horizontally mounted second lock pin is mounted so that the boom member can be supported in various vertical positions when not in use;

(d) a hydraulic cylinder having opposed ends with one end pivotally mounted on the frame means and with the other end pivotally attached intermediate the distal and proximal ends of the boom member to a flange with an opening on an underside of the boom member, wherein the other end of the hydraulic cylinder is adapted to be pivotally held in place in the flange on the underside of the boom member with a removable third lock pin in the opening in the flange;

(e) an extensible member telescopingly mounted inside the boom member along a length of each of the extensible and boom members, wherein the boom member and extensible member are provided with multiple openings along respective lengths each which mount a removable fourth lock pin for holding the extensible member in position in the boom member;

(f) a hydraulic pump means mounted on the box member and hydraulically connected to the hydraulic cylinder; and (g) securing means provided at the opposed ends of the frame means for attachment to the tractor to hold the kingpin assembly in the fifth wheel of the tractor, wherein the box member provides for storage for a lift means for towing a vehicle to be removably mounted at the distal end of the boom means.

14. The apparatus of claim 13 wherein the channel member is U-shaped which provides a bottom of the box member having opposed legs with the legs directed away from the box member and having the aligned holes through the legs for the first lock pin and wherein the kingpin assembly includes a kingpin mounted on a rectangular shaped member having at least one hole for mounting the first lock pin.

15. The apparatus of claim 13 wherein the plates are mounted on a support member which is part of the frame means, said support member being mounted at one end of the channel member and at said one of the ends of the frame means which is mounted to the boom member.

16. The apparatus of claim 15 wherein a bottom of the box member is provided by the channel member and an end of the box member is provided by the support member.

17. The apparatus of claim 16 wherein said box member includes opposed sides and said channel member includes legs and wherein said opposed sides of the box member are mounted adjacent to the legs of the channel member.

18. The apparatus of claim 17 wherein the plates are secured to said support member, and wherein the support member provides an end of the box member.

19. The apparatus of claim 18 wherein the hydraulic cylinder is mounted on the support member.

20. The apparatus of claim 19 wherein cap members are mounted on opposed sides of the support member.

21. The apparatus of claim 19 the securing means includes wherein first chain means mounted on the cap members and a second chain means mounted on the box member adjacent the kingpin assembly.

22. The apparatus of claim 13 wherein said boom means further includes a vehicle underlift attachment including an arm which is pivotally mounted by a removable fifth pin between the pair of plates and wherein the hydraulic cylinder is adapted for attachment to the arm by a removable sixth lock pin in a second flange on the arm and wherein the hydraulic cylinder may be disconnected from the boom member, said boom means being configured such that said boom member is secured above the arm.

23. The apparatus of claim 22 wherein the underlift attachment has a cross member having opposed ends, said cross member being attached to the arm intermediate the ends of the cross member, and extensions attached to the opposed ends of the cross member for supporting tires of a towed vehicle.

24. The apparatus of claim 23 wherein the extensions are L-shaped, each extension including two legs, wherein one of the legs of each of the extensions face each other and wherein the legs include means to position the legs relative to the cross member to accommodate tires of different towed vehicles.

25. The apparatus of claim 13 wherein the lock pins have handles for removal of the lock pins by hand.

* * * * *

UNITED STATES PATENT AND TRADEMARK OFFICE
CERTIFICATE OF CORRECTION

PATENT NO. : 5,409,345
DATED : April 25, 1995
INVENTOR(S) : Donald L. Pinkston

It is certified that error appears in the above-indentified patent and that said Letters Patent is hereby corrected as shown below:

Column 4, line 20, "sidewalls 2C" should read --sidewalls 12C--.

Column 5, line 31, "toward to" should read --toward the--.

Column 10, line 11, "44 is" should read --44 are--.

Column 12, line 22, after "boom 62", "is" should be deleted.

Column 13, line 53, "Once" should read --One--.

Column 14, line 9, "yoke 6A" should read --yoke 66A--.

Column 14, line 45, "toward t" should read --toward the--.

Column 15, line 49, "center portion 112" should read --center portion 112B--.

UNITED STATES PATENT AND TRADEMARK OFFICE
CERTIFICATE OF CORRECTION

PATENT NO. : 5,409,345
DATED : April 25, 1995
INVENTOR(S) : Donald L. Pinkston

It is certified that error appears in the above-indentified patent and that said Letters Patent is hereby corrected as shown below:

Column 16, line 22, "bard" should read --bars--.

Column 19, line 65 (Claim 13), after "lengths" and before "each", --of-- should be inserted.

Column 20, line 40 (Claim 21), "the securing means includes wherein first chain", should read --wherein the securing means includes first chain--.

Signed and Sealed this

Third Day of October, 1995

Attest:

BRUCE LEHMAN

Attesting Officer

Commissioner of Patents and Trademarks